(12) United States Patent
Wright et al.

(10) Patent No.: US 11,658,875 B2
(45) Date of Patent: May 23, 2023

(54) CLIENT-DRIVEN DYNAMIC SERVER-SIDE CONFIGURATION VALIDATION

(71) Applicant: Charter Communications Operating, LLC, St. Louis, MO (US)

(72) Inventors: Matthew J. Wright, Denver, CO (US); Christopher Aubut, Aurora, CA (US); Ethan J. Wright, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/500,205

(22) Filed: Oct. 13, 2021

(65) Prior Publication Data

US 2023/0116431 A1 Apr. 13, 2023

(51) Int. Cl.
    *G06F 15/177* (2006.01)
    *H04L 41/0869* (2022.01)
    *H04L 41/082* (2022.01)

(52) U.S. Cl.
    CPC ........ *H04L 41/0869* (2013.01); *H04L 41/082* (2013.01)

(58) Field of Classification Search
    CPC .......................... H04L 41/0869; H04L 41/082
    See application file for complete search history.

(56) References Cited

U.S. PATENT DOCUMENTS

| 9,552,237 | B2 | 1/2017 | Biesack |
| 10,248,634 | B2 | 4/2019 | Davis et al. |
| 10,802,931 | B1* | 10/2020 | Morkel .................. G06F 3/061 |
| 10,965,785 | B2 | 3/2021 | King |
| 2010/0031204 | A1* | 2/2010 | Kim ....................... G06F 30/36 716/100 |
| 2013/0283141 | A1 | 10/2013 | Stevenson et al. |

(Continued)

FOREIGN PATENT DOCUMENTS

| CN | 109624775 A | * | 4/2019 |
| CN | 111163002 A | * | 5/2020 |
| CN | 111880783 A | * | 11/2020 |

(Continued)

*Primary Examiner* — Richard G Keehn
(74) *Attorney, Agent, or Firm* — The Marbury Law Group, PLLC

(57) ABSTRACT

Various embodiments describe methods, systems, and devices for client-driven dynamic server-side configuration validation. Exemplary implementations may include validating client device configuration data, updating a client device shadow with the validated client device configuration data, in which the client device shadow includes a schema in a client device-agnostic language, and translating client device configuration data of the client device shadow from the client device-agnostic language to a client device-specific language. Also, receiving the client device configuration data from a computing device over a communication network, and sending the client device configuration data of the client device shadow in the client device-specific language to a client device via a communication network. Further, translating a client device schema from the client device-specific language to the client device-agnostic language, identifying differences in the client device schema from the schema of the client device shadow, and updating the client device shadow with the differences.

21 Claims, 15 Drawing Sheets

(56) References Cited

U.S. PATENT DOCUMENTS

2017/0284691 A1* 10/2017 Sinha ...................... F24F 11/30
2019/0027875 A1*  1/2019 Parks ................. H04B 7/15507

FOREIGN PATENT DOCUMENTS

| CN | 111917862 A | * | 11/2020 | ............ G06Q 50/10 |
| CN | 112260863 A | *  | 1/2021 | ............ C10G 32/02 |
| CN | 112788125 A | *  | 5/2021 | |
| CN | 112925276 A | *  | 6/2021 | |

\* cited by examiner

CLIENT-DRIVEN DYNAMIC SERVER-SIDE CONFIGURATION VALIDATION

BACKGROUND

Server-side application programming interface (API) validation is a common practice whereby a server checks input received from a user (e.g., through a website or phone application) and verifies a server can understand the input data. Developers write models to define a format for each specific field they expect to receive. The server will apply the models to all data fed to the API. Data that cannot be validated for an API may cause a fault.

The vast array of devices, including different versions of the same device, that a server can be configured to interact with requires that developers write models for every device and for variations between different versions of the same device. Similarly, servers need to be updated with new models to support compatibility with new devices and new versions of the same devices. Maintaining this compatibility with the vast array of devices incurs developer and server administration significant costs.

SUMMARY

Various aspects include methods for client-driven dynamic server-side configuration validation. One aspect of the present disclosure includes validating client device configuration data, updating a client device shadow with the validated client device configuration data, in which the client device shadow includes a schema in a client device-agnostic language, and translating client device configuration data of the client device shadow from the client device-agnostic language to a client device-specific language.

Some aspects may include receiving the client device configuration data from a computing device implementing a client device configuration interface over a communication network, in which the client device configuration data is based on a customer interacting with the client device configuration interface, and sending the client device configuration data of the client device shadow in the client device-specific language to a client device via a communication network.

Some aspects may include translating a client device schema from the client device-specific language to the client device-agnostic language, identifying differences in the client device schema from the schema of the client device shadow, and updating the client device shadow with the differences in the client device schema from the schema of the client device shadow.

In some embodiments, translating the client device schema from the client device-specific language to the client device-agnostic language may include using a schema mapping definition to translate the client device schema from the client device-specific language to the client device-agnostic language, and translating the client device configuration data of the client device shadow from the client device-agnostic language to the client device-specific language may include using the schema mapping definition to translate the client device configuration data of the client device shadow from the client device-agnostic language to the client device-specific language.

Some aspects may include creating a set of validator functions for the schema in the client device-agnostic language, in which validating the client device configuration data may include using the set of validator functions to validate the client device configuration data.

Some aspects may include associating the set of validator functions with the schema of the client device shadow in the client device-agnostic language.

Some aspects may include correlating client device with a schema mapping definition configured for translating schemas between the client device-specific language and the client device-agnostic language, in which the schemas include a client device schema and the schema of the client device shadow, and correlating the client device shadow with the schema mapping definition.

Further aspects may include a computing device having a processor configured to perform one or more operations of the methods summarized above. Further aspects may include a non-transitory processor-readable storage medium having stored thereon processor-executable instructions configured to cause a processor of a computing device to perform operations of the methods summarized above. Further aspects include a computing device having means for performing functions of the methods summarized above.

BRIEF DESCRIPTION OF THE DRAWINGS

The accompanying drawings, which are incorporated herein and constitute part of this specification, illustrate exemplary embodiments of the claims and together with the general description given above and the detailed description given below, serve to explain the features of the claims.

DETAILED DESCRIPTION

Figure 1:
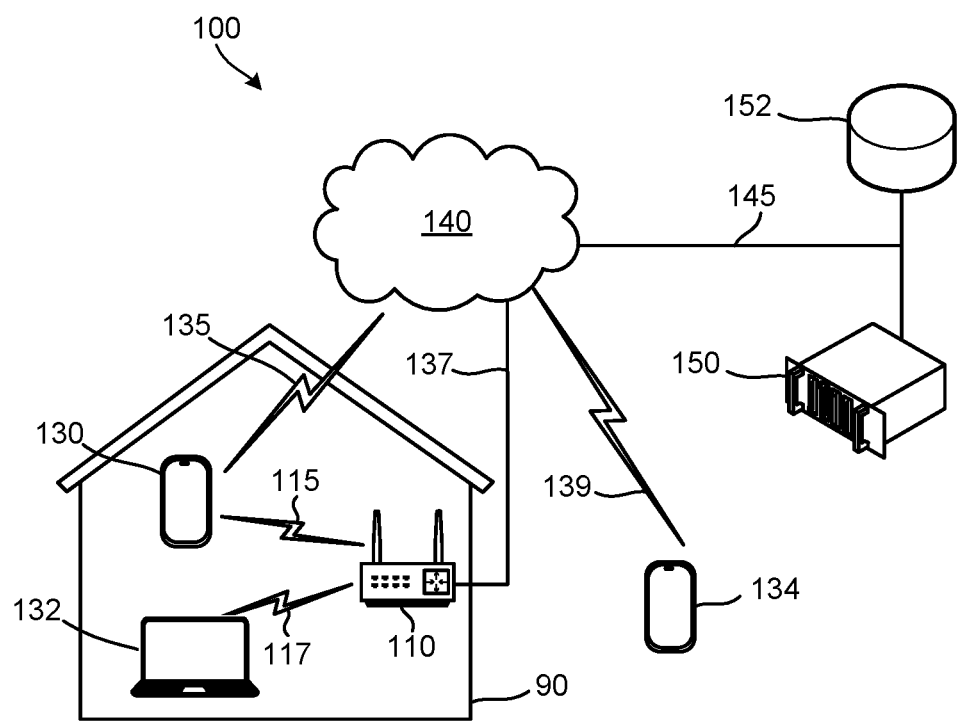
FIG. 1 is a schematic diagram conceptually illustrating an internet network in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include systems and methods for client-driven dynamic server-side configuration client device validation that may be agnostic to client device format specific models for handling configuration data. In some examples, the systems and methods may enable adding and/or updating client devices to a cloud network. In some examples, the systems and methods may enable adding and/or updating client device capabilities on the cloud network. In some examples, the systems and methods may enable activating and/or setting client device capabilities through the cloud network.

Generally, individual client device manufacturers and individual client device models may use different data formats for the configuration of client devices. Server-side application programming interface (API) validation may use a server to check input data received from a user (e.g., through a website or phone application) to verify a server may understand the input data. Developers write models to define a format for each specific field the software expects to receive. The server may apply the models to all data fed to the API. Data that may not be validated for an API may cause a fault.

Given the vast array of client devices, the task of server-side API validation is immense and expensive. Different validation models must be developed by a developer, updated by an administrator, and implemented by a server for each type of client device (e.g., make, model, version, etc. of a client device).

The embodiments described herein address the foregoing problems by providing for methods and systems enabling different client devices using different client device schemas, with different client device configuration data formats and client device capabilities, to all be access, configured, and validated through the same means and methods. The embodiment methods and systems may benefit developers by reducing the depth of knowledge developers may utilize about specific devices and specific protocols, and the small variances in the protocol versions, and reducing the time and effort administrators spend to keep servers up to date with validation processes for each change by the developers. The various embodiment methods and systems may reduce the amount of time to attach a new device to the cloud. Embodiment methods and systems may configure any client device using the same configuration language and cloud API calls. Further benefits include eliminating the need for a cloud update to expose a new configuration parameter or updating a parameter's validators. Rather, the changes may be implemented by a client device firmware update. The embodiment methods and systems may allow for many different types of client devices to be configured by the same cloud network using the same language.

The embodiment methods and systems may implement client device schema translation and convert a client-specific language into a client-agnostic format understandable throughout a cloud network. The embodiment methods and systems may take advantage of triage done by the system that maintains a connection with a client device. The embodiment methods and systems may also take advantage of configurations created by developers to ensure the mapping procedure is executed correctly.

The embodiment methods and systems may implement client device validation that take the client-agnostic versions of schemas, and automatically creating sets of validator functions. The validator functions may be associated with a client device shadow in the cloud network, and may be run anytime an operation to update or change a client device is executed. Additional validator functions may be associated with a client device shadow that would further restrict the values fields that the client shadow would accept on an update or change.

The embodiment methods and systems may implement a set of client device capabilities that define various subsets of functionality for a client device in a client-agnostic language. These various capability definitions may form the possible attributes a client device can have. Client device schema translation may be responsible for translating any client-specific language into the client-agnostic language of the cloud network, and the client-agnostic language of the cloud network may be built upon the client device capabilities.

As used herein, the term "router" refers to a piece of network hardware that allows communication between electronic devices on a local network—like personal computers, mobile computing devices, lights, appliances, doors, locks, printers, and other connected devices—and the internet.

As used herein, the terms "computing device", "client device", and "client" are used interchangeably to refer to an electronic device equipped with at least a processor, communication systems, and memory configured to receive configuration data and implement configuration settings using the received configuration data to implement capabilities. Computing devices may include, but are not limited to, any one or all of personal computers, portable computing devices, rack mounted computers, routers, modems, mobile devices, cellular telephones, smart phones, personal or mobile multi-media players, personal data assistants (PDAs), tablet computers, smart books, palm-top computers, desk-top computers, wireless electronic mail receivers, cellular telephones, gaming consoles, wireless gaming controllers, streaming media players (such as, ROKU®), DVRs, satellite or cable set top boxes, smart televisions, smart watches, smart buttons, smart appliances (such as refrigerators, ovens, washers and dryers, HVAC, water heaters, sprinklers, lighting fixtures and blubs, etc.), smart utility devices (such as water, electricity, and gas meters) smart speakers and assistants, smart home surveillance and security equipment (such as video doorbells, door locks, security video monitors, intrusion sensors, environmental sensors, etc.), smart home hubs, smart remote control devices (i.e., television remote controls with sufficient processing capabilities), smart cameras, smart pet accessories, voice over internet protocol (VOIP) telephones, printers, medical monitoring equipment and devices, embedded computers (such as in vehicles for infotainment, navigation, communication, etc.), Internet of Things (IoT) devices, and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, a cloud server or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

FIG. 1 illustrates an example of an internet network 100 in accordance with various embodiments. With reference to FIG. 1, the internet network 100 may include a router 110, which may be located in a home 90 or other building/area, a user computing device 130, a client device 132, 134 (which may include the router 110), and a remote server 150 (e.g., a cloud-based server) that may be accessed via a communication network 140 (e.g., the Internet). A user of the user computing device 130 that wants to configure a client device 132, 134 may send configuration data to the remote server 150 for determining validation of the configuration data. The remote server 150 may obtain a validator function for the client device 132, 134, based on a client device-agnostic schema for the client device 132, 134, from a memory 152 (e.g., a magnetic, solid-state, optical, or tape, data storage device), and apply the validator function to the configuration data. The remote server 150 may translate valid configuration data to a client device-specific format and send the valid configuration data to the client device 132, 134. The client device 132, 134 may receive the valid configuration data in the client device-specific format and use the valid configuration data to configure the client device 132, 134.

The router 110 may be a network hardware device that enables communication between networked devices, like one or more computing devices 130 and client devices 132, and the communication network 140. The router 110 may include the functionality of a modem, which lets the network computing devices access the communication network 140. Alternatively, the router 110 may be connected to and work with a separate modem that connects the router 110 to the communication network 140.

The user computing device 130 may be any electronic device equipped with at least a processor, communication systems, and memory configured to receive and send user input configuration data for the client device 132, 134. The remote server 150 may be any electronic device equipped with at least a processor, communication systems, and memory configured to receive the configuration data, validate the configuration data, translate the valid configuration data to a client device-specific format, and send the valid configuration data to the client device 132, 134. The client device 132, 134 may be any electronic device equipped with at least a processor, communication systems, and memory configured to receive the valid configuration data and use the valid configuration data to configure the client device 132, 134.

The user computing device 130 and the client device 132 may be coupled to the router 110 by a short-range wireless connection 115 (e.g., Wi-Fi, Bluetooth, etc.). The router 110 may be coupled to the remote server 150 by one or more wired connections 137 to the communication network 140, and one or more additional wired and/or wireless connections 145 from the communication network 140 to the remote server 150. The user computing device 130, alternatively, or additionally, and the client device 134 may be coupled to the remote server 150 by a long-range wireless connection 135, 139 to the communication network 140, and one or more additional wired and/or wireless connections 145 from the communication network 140 to the remote server 150.

The communication links 115, 117, 135, 137, 139, 145 may use a variety of wireless (e.g., 5g-NR(u), LTE, Citizens Broadband Radio Service (CBRS), etc.) and/or wired networks (e.g., Ethernet, TV cable, telephony, fiber optic and other forms of physical network connections) that may use one or more communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Figure 2:
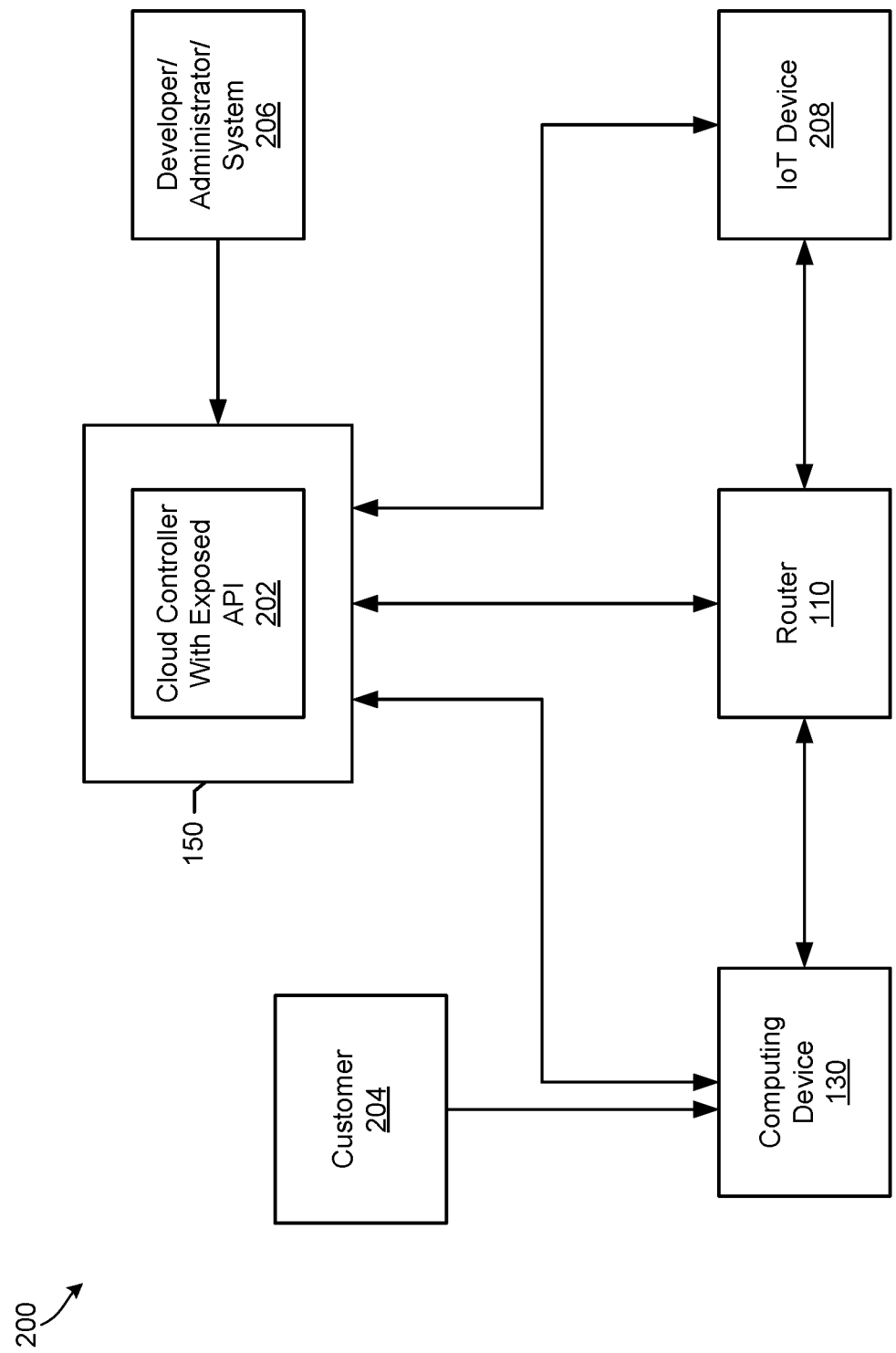
FIG. 2 is a schematic diagram conceptually illustrating an internet network in accordance with various embodiments.

FIG. 2 illustrates an example of an internet network 200 in accordance with various embodiments. With reference to FIGS. 1 and 2, the remote server 150 may include a cloud controller 202 configured with an exposed API. The exposed API may provide developers and/or administrators 206 access to add client devices (e.g., client devices 132, 134) to the remote server 150 for cloud based configuration validation. The cloud controller 202 may include one or more of a digital processors, an analog processor, a digital circuit designed to process information, an analog circuit designed to process information, a state machine, and/or other mechanisms for electronically processing information. The cloud controller 202 may be a single unit or may include a plurality of processing units. The one or more processing units may be physically located within the same device, or one or more of the processing units may represent processing functionality of a plurality of devices, remote from one another and operating in coordination.

A developer and/or administrator 206 may include a developer for a client device and/or an administrator of the remote server 150. The developer and/or administrator 206 may add and/or update client devices to the remote server 150 by adding and/or updating client device schemas and client device capabilities for new and/or existing client devices to the remote server 150. A client device schema may indicate the type, format, and/or values of data the client device may be able to use. The client device schema may include definitions for any number and combination of client device configurations. Client device capabilities may indicate the functionalities of the client device that may be exposed for configuration input and/or state consumption by the remote server 150.

A customer 204 may be a user and/or owner of a client device. The customer 204 may provide configuration data to the remote server 150 through a computing device (e.g., computing device 130) executing an interface (e.g., an application and/or website) for providing the configuration data. The customer 204 may provide configuration data through text entry fields and/or selection of options from selectable elements (e.g., dropdown menus, radio buttons, checkboxes, sliders, etc.).

A client device (e.g., client device 132, 134) may include any computing device, such as a computing device 130, a router 110, and/or an IoT device 208. The client devices may communicate with the remote server 150 using a variety of wired and wireless communication networks (e.g., communication links 115, 117, 135, 137, 139, 145). Communications between the client devices and the remote server 150 may include the client devices and remote server 150 exchanging connection communications to establish communication. Once communication is established, communications between the client devices and the remote server 150 may include the client devices sending their client device schemas, requests for their client device schemas, client device identifiers (IDs) and/or client device configuration state data to the remote server 150. Communications between the client devices and the remote server 150 may include and the remote server 150 sending the client device schemas and/or valid configuration data to the client device.

The cloud controller 202 may be configured to enact the addition and/or update of the client devices to the remote server 150 by the developers and/or administrators 206. The cloud controller 202 may be configured to receive, process, and respond to the configuration data provided by the customer 204. The cloud controller 202 may be configured to receive, process, and respond to the communications with the client devices. The structure, functions, and processes of the cloud controller 202 are described in greater detail herein.

Figure 3:
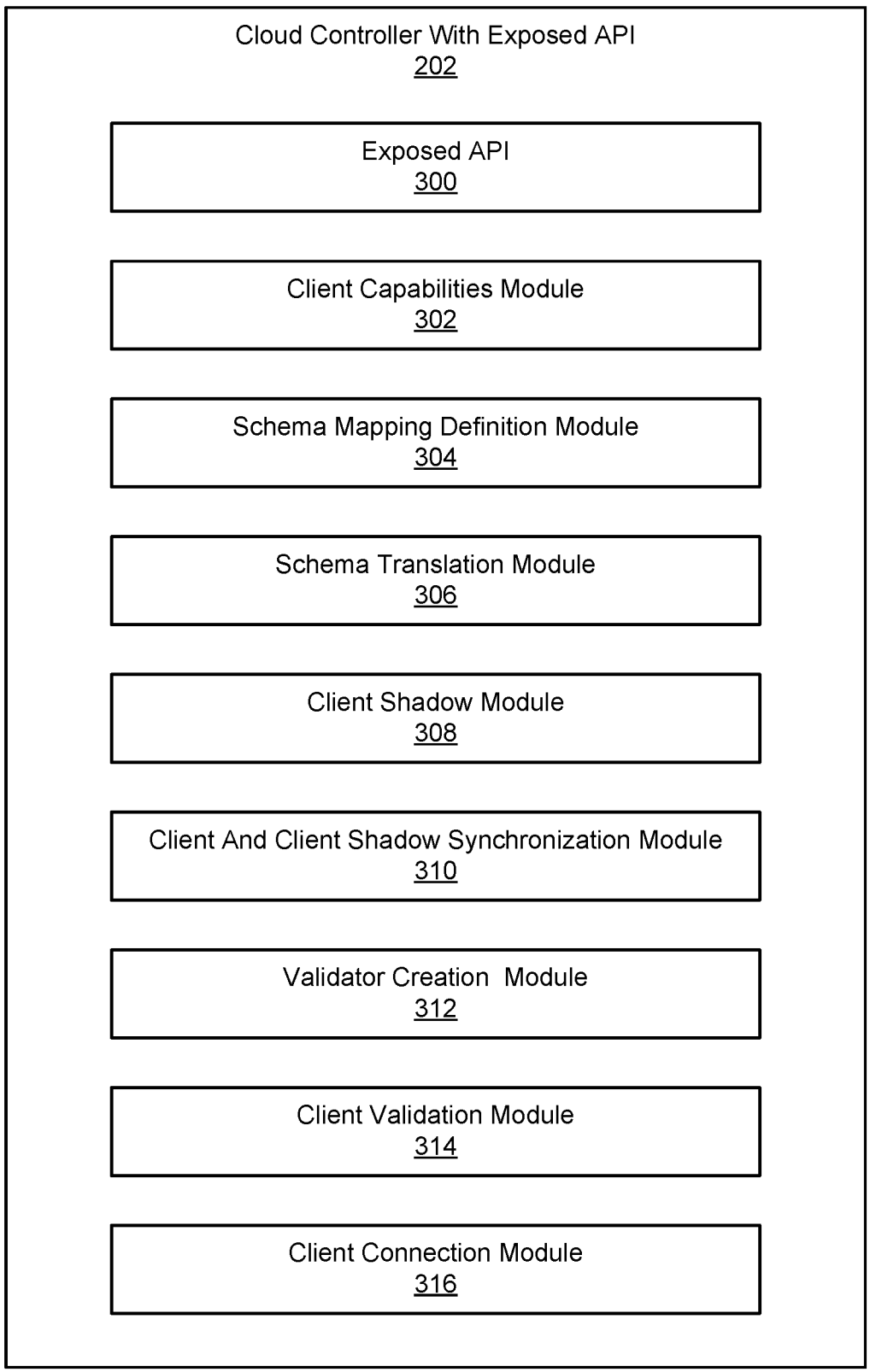
FIG. 3 is a block diagram illustrating a cloud network based processing device configured with executable modules in accordance with various embodiments.

FIG. 3 illustrates a cloud network based processing device, cloud controller 202 with exposed API 300, configured with executable modules 302-316 in accordance with various embodiments. With reference to FIGS. 1-3, the cloud controller 202 may be configured with executable instructions for implementing the exposed API and the executable modules 302-316. The exposed API 300 and executable modules 302-316 may be stored on and accessed by the cloud controller 202 from a memory device (e.g., memory 152).

The exposed API 300 may include functionality that may be used by the developer and/or administrator (e.g., developer and/or administrator 206) to add and/or update client devices (e.g., router 110, computing device 130, client device 132, 134, IoT device 208) to the remote server 150. The exposed API 300 may enable the developer and/or administrator 206 to add and/or update client device schemas and client device capabilities for new and/or existing client devices to the remote server 150. The exposed API 300 may include functionality that may be used by the customer (e.g., customer 204) to access and/or set configurations of the client device. For example, through a client device interface, the customer may see current client device capabilities and settings, and the customer may provide configuration data for the capabilities, which may include providing new settings and/or changing settings.

A client device capabilities module 302 may include instructions for execution by the cloud controller 202 to define, read, and reference client device capabilities. A client device capability definition of client device capabilities may indicate the functionalities of the client device that may be exposed for configuration input and/or state consumption by the remote server 150. For example, capabilities may include communication technologies (e.g., Wi-Fi, Bluetooth, etc.) encryption types, location services, input devices (e.g., microphone, camera, etc.), etc. available for use by the client device. The client device capability definitions may be written in a syntax that isn't client device specific. New client device capability definitions and changes to client device capability definitions may occur whenever a new capability may be exposed by the cloud network, or whenever an update to a capability may be exposed in a new version of the definition.

A schema mapping definition module 304 may include instructions for execution by the cloud controller 202 to enable developers to define mappings between a client device schema and cloud (client device-agnostic) schema. A schema mapping definition may define the translation mechanism between the client device schema and the cloud schema. The schema mapping definitions may be written in a syntax that may be agnostic to any client device, though the contents of the schema mapping definitions may be specific to a client device-specific language and structure, which may be dependent on client device firmware. The schema mapping definitions may be used to translate schemas, states, and configuration data between the client device-specific language and the cloud's client-agnostic language. New schema mapping definitions may occur whenever a client device with a new, not yet defined schema mapping is expected to connect to the cloud network.

A schema translation module 306 may include instructions for execution by the cloud controller 202 to translate a client device schema in a client device-specific language to the client device-agnostic cloud schema language that can be understood by applications inside or using the cloud network. For example, the schema translation module 306 instructions may include parsing the client device schema in the client device-specific language, and rewriting the client device schema in the client device-agnostic language using the parsed data. For example, the schema translation module 306 may use a schema mapping definition for the client device to rewrite the client device schema in the client device-agnostic language. The schema translation module 306 instructions may include correlating schema mapping definitions and client device shadows, parsing information sent from client devices, and using the schema mapping definitions and parsed information to convert information to be readable by the client device.

A client device shadow module 308 may include instructions for execution by the cloud controller 202 to create a client device shadow as a representation of a client device stored in and synchronized with the cloud network. The client device shadow module 308 instructions may include enabling management and reading of configuration data and state information of the client device. The client device shadow may be stored in association with metadata about the client device, such as a client device ID, enabling applications to consistently interact with the client device shadow. Any configuration changes to the client device shadow may be reflected on the client device, and any state changes on the client device may be reflected in the cloud network by the client device shadow. The client device shadow may be written in a syntax that isn't client device-specific. New client device shadows and changes to client device shadows may occur whenever a new client device is made known to the cloud network, and whenever configuration data or state information for a client device changes. New client device shadows may be created for client devices introduced to the cloud network, for example, by any of developers and/or administrators (e.g., developer and/or administrator 206), and/or executable modules of the cloud controller 202 configured to determine client devices that do not yet have associated client device shadows. Client device shadows may be updated based on changes to the client device configuration data or state information, for example, by any of developers, administrators, customers, client devices, and/or separate cloud systems (e.g., systems that update configuration data or state information based on actions within the system, such as systems that add user accounts based on user interactions with the systems).

A client device and client device shadow synchronization module 310 may include instructions for execution by the cloud controller 202 to synchronize changes in configuration data and state information between the client device and client device shadow. The client device and client device shadow synchronization module 310 instructions may include monitoring or listening for any configuration and state changes to the client device shadow and send those changes to the schema translation module 306. The client device and client device shadow synchronization module 310 instructions may include relaying state changes, after translation, and providing the state changes to the client device shadow module 308.

A validator creation module 312 may include instructions for execution by the cloud controller 202 to generate a set of validator functions for use by a client device validation module 314 from a client device-agnostic schema. The set of validator functions may be associated with the client device-agnostic schema. The set of validator functions may be used to ensure any updates to a client device shadow are valid for the associated client device. For example, the set of validator functions may validate format and/or content of configuration data intended for the client device associated with the client device shadow.

The client device validation module 314 may include instructions for execution by the cloud controller 202 to execute sets of validator functions whenever changes to a client device shadow might occur. In some examples, the client device validation module 314 instructions may include proposing changes to the client device shadow. The client device validation module 314 instructions may include running any proposed changes to a client device shadow against the validator functions associated with that client device.

A client device connection module 316 may include instructions for execution by the cloud controller 202 to be a point of contact for client devices. The client device connection module 316 instruction may include supporting different varieties of connections, such as a persistent connection (e.g., JSON RPC) or a one off connection (e.g., REST API calls) and conducting basic triage may to parse out necessary details for the cloud network (e.g., protocol of communication). The client device connection module 316 instruction may include asking clients devices for a client device schema whenever a client device connects to the cloud network. The client device connection module 316 instruction may include extracting information from the client device, such as a unique client device ID for use upstream in the cloud network.

Figure 4:
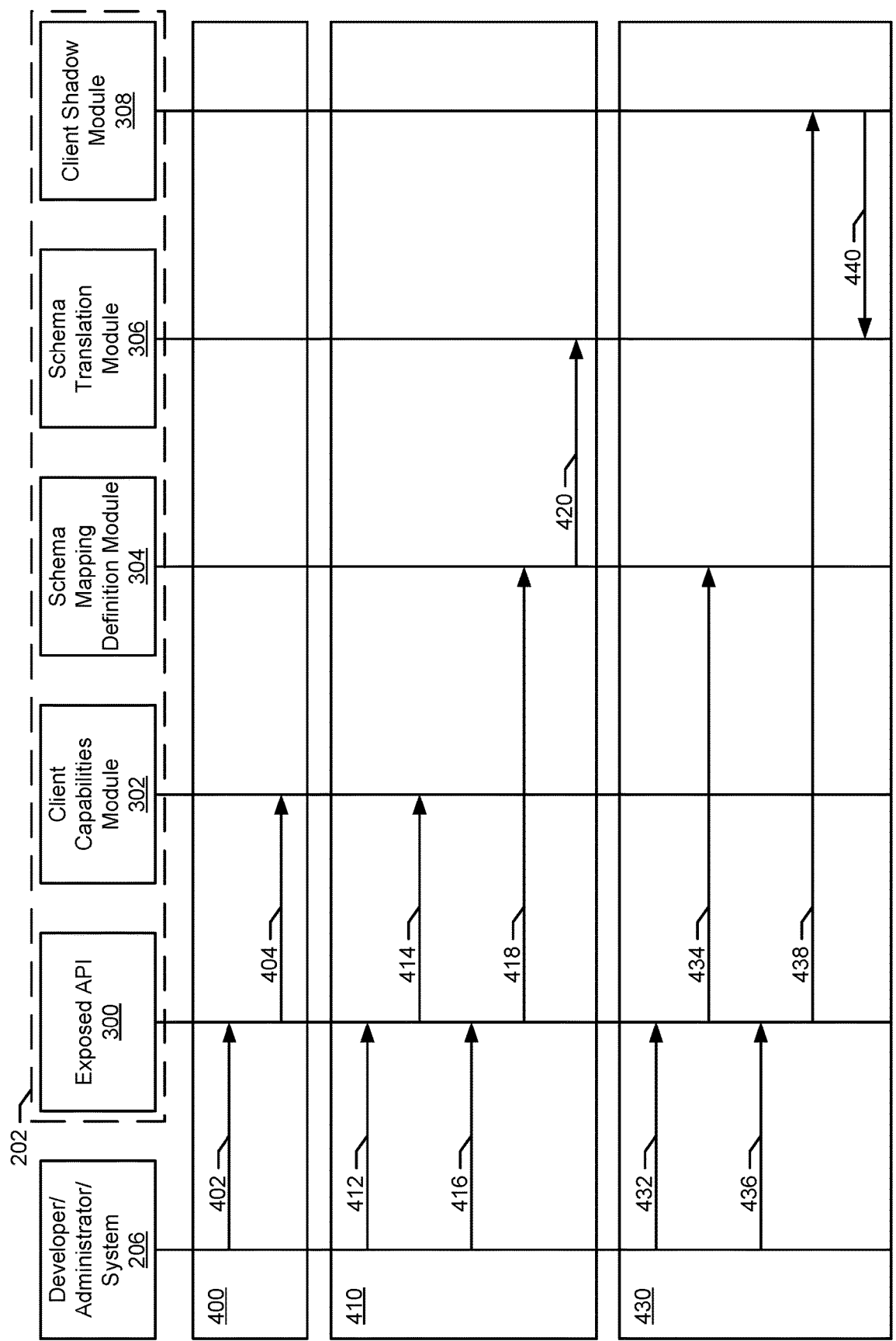
FIG. 4 illustrates an example communication flow diagram of adding and/or updating a client device to a cloud network in accordance with various embodiments.

FIG. 4 illustrates an example communication flow for adding and/or updating a client device (e.g., router 110, computing device 130, client device 132, 134, IoT device 208) to a cloud network (e.g., remote server 150) in accordance with various embodiments. With reference to FIGS. 1-4, adding a client device to the cloud network may include communications for adding and/or updating client device capability definitions 400, adding and/or updating schema mapping definitions 410, and adding and/or updating a client device shadow 430 to the cloud network. Communications 400, 410, 430 may occur between a developer and/or administrator 206 and the cloud controller 202 on the cloud network. Communications 400, 410, 430 may also occur between executable modules (e.g., exposed API 300, executable modules 302-316) on the cloud controller 202.

Adding and/or updating client device capability definitions 400 may include the developer and/or administrator 206 accessing 402 the exposed API 300 to create and/or update existing client device capability definitions. The developer and/or administrator 206 may use the functions of the exposed API 300 to call functions of and pass data to 404 the client device capabilities module 302 to create and/or read and edit client device capability definitions for a new or a new version of a client device. The client device capabilities module 302 may store client device capability definitions to a memory (e.g., memory 152) of the cloud network for use in other aspects of the communications, as described further herein.

Adding and/or updating schema mapping definitions 410 may include the developer and/or administrator 206 accessing 412 the exposed API 300 to access previously created client device capability definitions. The developer and/or administrator 206 may use the functions of the exposed API 300 to call functions 414 of the client device capabilities module 302 to retrieve stored client device capability definitions for the new and/or the new version of the client device. The developer and/or administrator 206 may use or reference the client device capability definitions while writing a schema mapping definition for the client device.

The developer and/or administrator 206 may access 416 the exposed API 300 to create and/or update schema mapping definitions. The developer and/or administrator 206 may use the functions of the exposed API 300 to call functions of and pass data 418 to the schema mapping definition module 304 to create and/or read and edit schema mapping definitions for the new or the new version of the client device. The schema mapping definition module 304 may store schema mapping definitions to a memory (e.g., memory 152) of the cloud network for use in other aspects of the communications, as described further herein.

The schema mapping definition module 304 may send the schema mapping definitions 420 to the schema translation module 306. The schema translation module 306 may use the schema mapping definitions for later correlating a client device shadow with the schema mapping definitions, translating the schema mapping definitions to a client-agnostic language, and parsing of configuration data received for a client device so that the configuration data may be understood by applications on the cloud network.

Adding and/or updating a client device shadow 430 may include the developer and/or administrator 206 accessing 432 the exposed API 300 to access previously created schema mapping definitions for the client device. The developer and/or administrator 206 may use the functions of the exposed API 300 to call functions 434 of the schema translation module 306 to retrieve the schema mapping definitions for the client device.

The developer and/or administrator 206 may access 436 the exposed API 300 to create and/or update a client device shadow for the client device. The developer and/or administrator 206 may use the functions of the exposed API 300 to call functions 438 of the client device shadow module 308 to create and/or update the client device shadow for the client device. The client device shadow module 308 may store the client device shadow to a memory (e.g., memory 152) of the cloud network for use in other aspects of the communications, as described further herein. The client device shadow module 308 may send the client device shadow and/or changes to the client device shadow 440 to the schema translation module 306. The schema translation module 306 may later parse configuration data of the client device shadow for configuration of the client device.

In some examples, other executable modules of the cloud controller 202 may be configured to determine the client device does not yet have an associated client device shadow and may access the exposed API 300 to create and/or update a client device shadow for the client device. In some examples, client device shadows may be updated based on changes to the client device configuration data or state information may be made, for example, by any of developers and/or administrators 206, customers (e.g., customers 204), client devices, and/or separate cloud systems, accessing the exposed API 300 to update a client device shadow for the client device.

Figure 5:
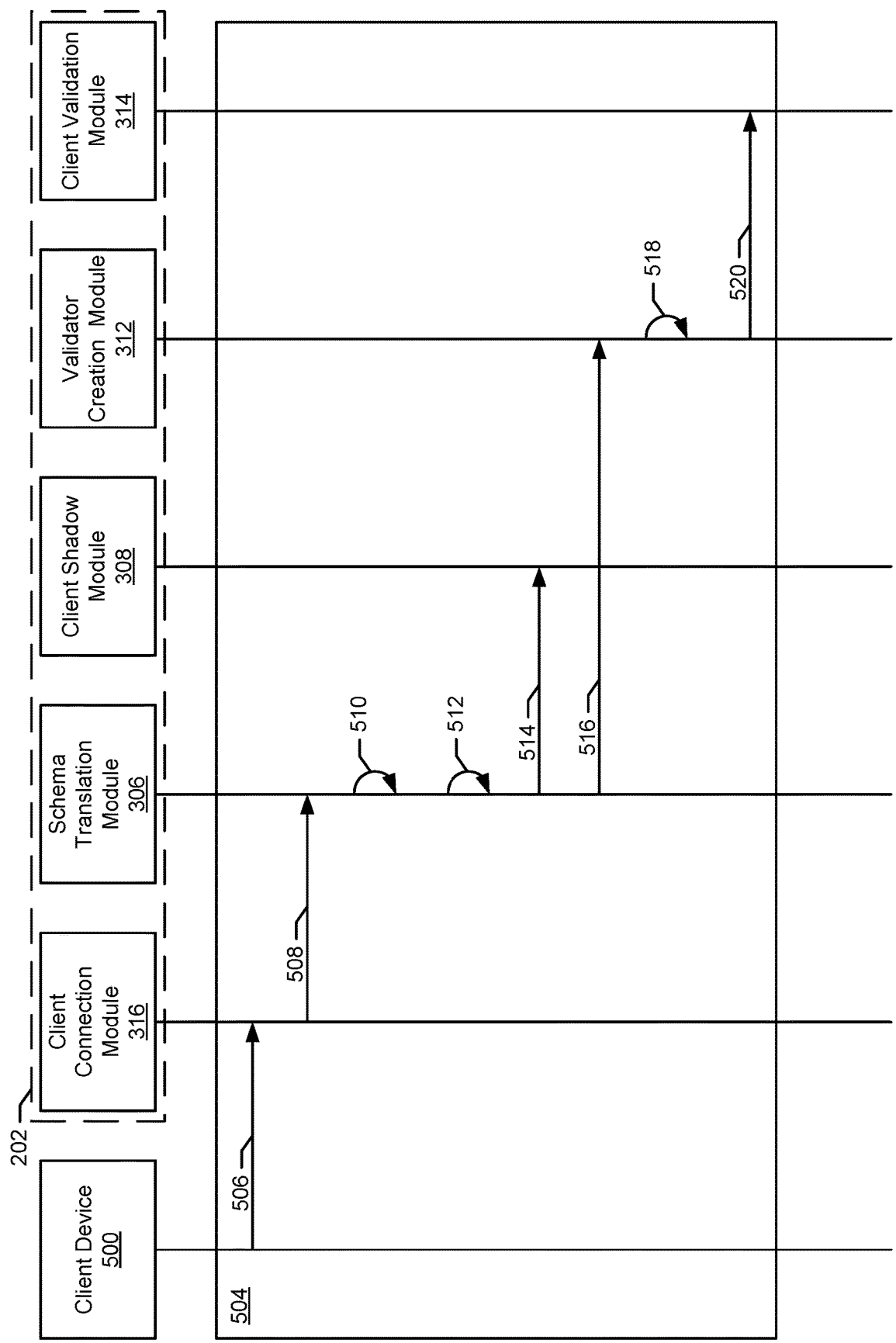
FIG. 5 illustrates an example communication flow diagram of connecting a client device to a cloud network in accordance with various embodiments.

FIG. 5 illustrates an example communication flow for connecting a client device 500 (e.g., router 110, computing device 130, client device 132, 134, IoT device 208) to a cloud network (e.g., remote server 150) in accordance with various embodiments. With reference to FIGS. 1-5, connecting a client device to the cloud network may include communications for connecting the client device 500 to the cloud network 504. Communications 504 may occur between the client device 500 and the cloud controller 202 on the cloud network. Communications 504 may also occur between executable modules (e.g., executable modules 302-316) on the cloud controller 202.

Connecting the client device 500 to the cloud network 504 may include the client device 500 setting up a communication session 506 with the client device connection module 316. Setting up a communication session 506 may be implemented by various known means for different communication protocols employed by the client device 500. In some examples, the client device 500 may send the client device schema for the client device 500 to the client device connection module 316. In some examples, the cloud network may request the client device schema from the client device 500 and may receive the client device schema from the client device 500 at the client device connection module 316 in response to the request. Other information, such as client device metadata, including a client device ID, may be sent by the client device 500 to the client device connection module 316.

The client device connection module 316 may forward 508 information received from the client device to the schema translation module 306. The information forwarded to the schema translation module 306 may include the client device schema and the client device metadata, including the client device ID.

The schema translation module 306 may correlate 510 a client device shadow for the client device 500 with a schema mapping definition using the client device ID. The client device schema and/or the client device ID may correspond with identifying information of the client device shadow and the schema mapping definition. The schema translation module 306 may compare and match the client device schema and/or the client device ID with the corresponding identifying information of the client device shadow and the schema mapping definition to make the correlations.

The schema translation module 306 may translate 512 the client device schema from a client device-specific language to a client device-agnostic language. The client device-agnostic language may be a language understandable by applications implemented on the cloud network. The schema translation module 306 may parse the client device schema in the client device-specific language to retrieve the client device configuration elements and configuration data. The schema translation module 306 may be configured to recognize the client device configuration elements and configuration data and rewrite the client device configuration elements and configuration data in the client device-agnostic language. The schema translation module 306 may use a schema mapping definition associated with the client device 500 to translate 512 the client device schema from a client device-specific language to a client device-agnostic language. Translating the client device schema from a client device-specific language to a client device-agnostic language may generate a client device-agnostic schema. The client device 500 may be associated with the client-device agnostic schema by associating the client device-agnostic schema with a client device-agnostic schema ID. For example, the client device-agnostic schema ID may be associated with the metadata of the client device 500, such as the client device ID. For example, the client device-agnostic schema ID may incorporate all or part of the client device ID.

The schema translation module 306 may send 514 the client device-agnostic schema ID to the client shadow module 308 for storage in association with the client device shadow. The schema translation module 306 may send 516 the client device-agnostic schema ID to the validator creation module 312. The schema translation module 306 may generate 518 a set of validator functions for use by the client device validation module 314 from the client device-agnostic schema. The schema translation module 306 may send 520 the set of validator functions to the client device validation module 314 for storage and later use.

Figure 6:
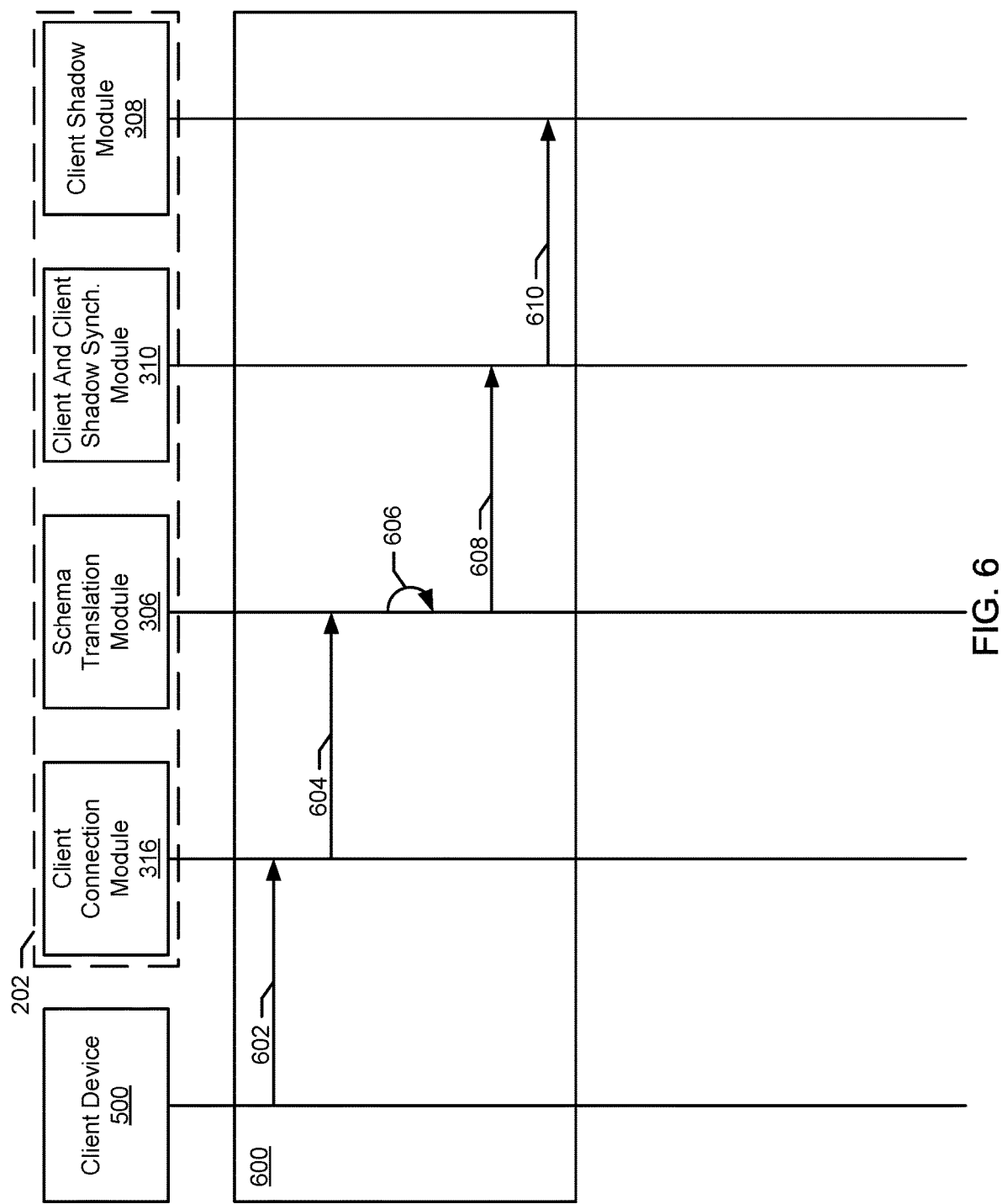
FIG. 6 illustrates an example communication flow diagram of uploading a state of a client device to a cloud network in accordance with various embodiments.

FIG. 6 illustrates an example communication flow for uploading a state of a client device 500 (e.g., router 110, computing device 130, client device 132, 134, IoT device 208) to a cloud network (e.g., remote server 150) in accordance with various embodiments. With reference to FIGS. 1-6, uploading a state of a client device 500 to the cloud network may include communications 600 for uploading a state of the client device to the cloud network. Communications 600 may occur between the client device 500 and the cloud controller 202 on the cloud network. Communications 600 may also occur between executable modules (e.g., executable modules 302-316) on the cloud controller 202.

Uploading a state of the client device 500 to the cloud network 504 may include the client device 500 sending 602 state information of the client device 500 to the client device connection module 316. The client device 500 may send 602 the state information using an established communication session. For example, the client device 500 may send 602 the state information using the communication session established in setting up a communication session 506 as part of the communications 504 described herein with reference to FIG. 5. The state information of the client device 500 may be in the client device-specific language.

The client device connection module 316 may forward 604 the state information of the client device 500 to the schema translation module 306. The schema translation module 306 may translate 606 the state information of the client device 500 into the client device-agnostic language. The schema translation module 306 may parse the state information of the client device 500 in the client device-specific language to retrieve the state information. The schema translation module 306 may be configured to recognize the state information and rewrite the state information in the client device-agnostic language. Translating the state information of the client device 500 from a client device-specific language to a client device-agnostic language may generate a client device-agnostic state information.

The schema translation module 306 may send 608 the client device-agnostic state information to the client device and client device shadow synchronization module 310. The client device and client device shadow synchronization module 310 may identify changes in the client device-agnostic state information. For example, the client device and client device shadow synchronization module 310 may compare the client device-agnostic state information to prior client device-agnostic state information to determine if and where changes have occurred. The client device and client device shadow synchronization module 310 may send 610 the changes in the client device-agnostic state information to the client device shadow module 308 for updating the client device shadow of the client device with the changes in the client device-agnostic state information.

Figure 7:
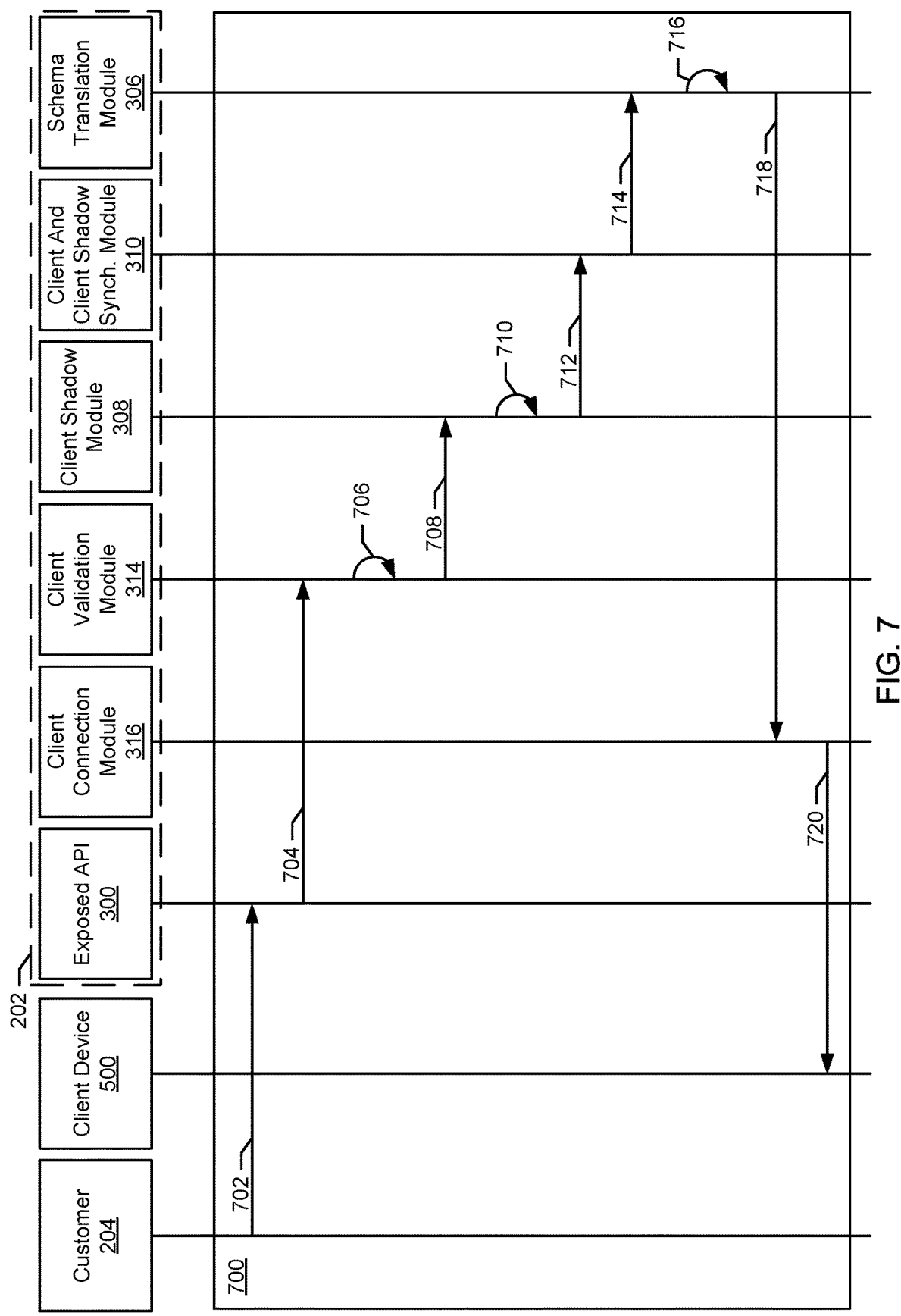
FIG. 7 illustrates an example communication flow diagram of changing a configuration of a client device on a cloud network in accordance with various embodiments.

FIG. 7 illustrates an example communication flow for changing a configuration of a client device 500 (e.g., router 110, computing device 130, client device 132, 134, IoT device 208) on a cloud network (e.g., remote server 150) in accordance with various embodiments. With reference to FIGS. 1-7, changing a configuration of a client device 500 on the cloud network may include communications for changing a configuration of the client device on the cloud network 700. Communications 700 may occur between a customer 204, the client device 500, and the cloud controller 202 on the cloud network. Communications 600 may also occur between executable modules (e.g., exposed API 300, executable modules 302-316) on the cloud controller 202.

Changing a configuration of a client device 500 on the cloud network may include the customer 204 accessing 702 the exposed API 300 to make a change in and/or provide new configuration data for the client device 500. The customer 204 may access 702 the exposed API 300 via an interface (e.g., a website or application) configured to enable the customer 204 to provide and change configuration data for the client device 500 via a network connection (e.g., communication links 115, 117, 135, 137, 139, 145) to the cloud network. The customer may access and interact with the interface via a computing device (e.g., computing device 130, client device 132, 134, IoT device 208, client device 500). The customer 204 interaction with the interface may access 702 functions of the exposed API 300 to format the configuration data for use in the cloud network.

The exposed API 300 may send 704, the configuration data to the client validation module 314. The client validation module 314 may execute 706 validator functions associated with the client device 500 to validate the configuration data. The validator functions may be input the configuration data and may validate that the format and/or content of the configuration data is correct for the client device.

The client validation module 314 may send 708 valid configuration data to the client device shadow module 308. The client device shadow module 308 may update 710 the client device shadow associated with the client device 500 with the valid configuration data. The client device shadow module 308 may send 712 updated configurations of the client device shadow to the client device and client device shadow synchronization module 310. The client device and client device shadow synchronization module 310 may send 714 the updated configurations of the client device shadow to the schema translation module 306.

The schema translation module 306 may translate 716 the updated configurations to a client device-specific schema. Using a schema mapping definition associated with the client device shadow that is updated with the valid configuration data, the schema translation module 306 may translate the updated configurations from the shadow client device, in the client device-agnostic language schema, to a client device-specific schema. The schema translation module 306 may send 718 the client device-specific language schema with the updated configuration information to the client device connection module 316. The client device connection module 316 may forward 720 the client device-specific language schema with the updated configuration information to the client device 500.

Figure 8:
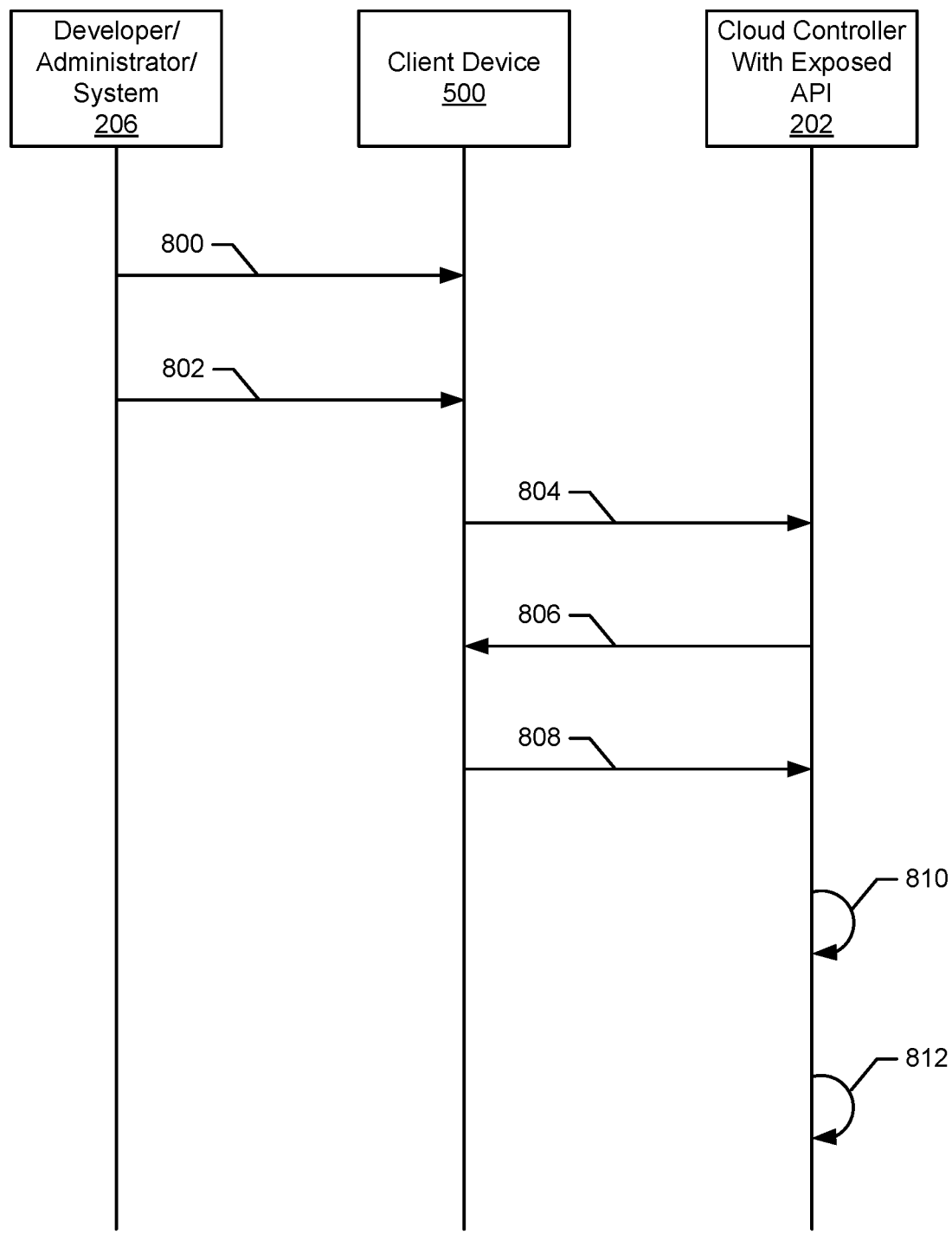
FIG. 8 illustrates an example communication flow diagram of changing a configuration of a client device on a cloud network in accordance with various embodiments.

FIG. 8 illustrates an example communication flow for changing a configuration format of a client device 500 (e.g., router 110, computing device 130, client device 132, 134, IoT device 208) on a cloud network (e.g., remote server 150) in accordance with various embodiments. With reference to FIGS. 1-8, changing a configuration format of the client device 500 on the cloud network may include communications that may occur between a developer and/or administrator 206, the client device 500, and the cloud controller 202 on the cloud network. Changing a configuration format of the client device 500 on the cloud network may include changing a format, variables, options, settings, etc. for the configuration of the client device 500. The following descriptions are presented in terms of a non-limiting example of changing a format of an allowable password length for connecting a computing device (e.g., computing device 130, client device 132, 134, IoT device 208) to the client device 500.

Changing a configuration of a client device 500 on the cloud network may include the developer and/or administrator 206 sending 800 a new and/or updated schema to the client device 500. The new and/or updated schema may specify that an allowable password length, such as a minimum or maximum length, may be 10 characters, which may be an increase from a current schema allowing a password length of 8 characters. The developer and/or administrator 206 may flash 802 a firmware of the client device 500 with the new and/or updated schema. In some examples, a customer (e.g., customer 204) and/or the client device 500 itself may implemented flashing the firmware. The firmware of the client device 500 may now accept passwords set for the client device that are 10 characters, and reject passwords set for the client device that are not 10 characters, including previously acceptable 8 character passwords.

The client device 500 may connect 804 to the cloud network via the cloud controller 202. As part of or in response to the connection of the client device 500 to the cloud network, the cloud controller 202 may request 806 a schema from the client device 500. The client device 500 may respond to the request 806 by sending 808 the schema to the cloud controller 202. The schema sent to the cloud controller 202 may be the new and/or updated schema previously flashed 802 to the client device 500. The schema sent to the cloud controller 202 may be different from a previous schema uploaded to the cloud controller 202 upon which a client device shadow of the client device 500 may be based. For example, the client device shadow may have a format for password length of 8 characters, while the schema sent to the cloud controller 202 may have a format for password length of 10 characters.

The cloud controller 202 may create 810 a set of validator functions for the received schema, and associate the set of validator functions with a client device shadow of the client device 500. The set of validator functions may be configured 812 to validate configuration data according to restrictions and options of the schema received from the client device 500. For example, the set of validator functions may be configured to validate whether a configuration data of the client device 500 includes a password with 10 characters. In this example, the cloud controller 202 may now accept passwords set for the client device that are 10 characters, and reject passwords set for the client device that are not 10 characters, including previously acceptable passwords of 8 characters.

Figure 9:
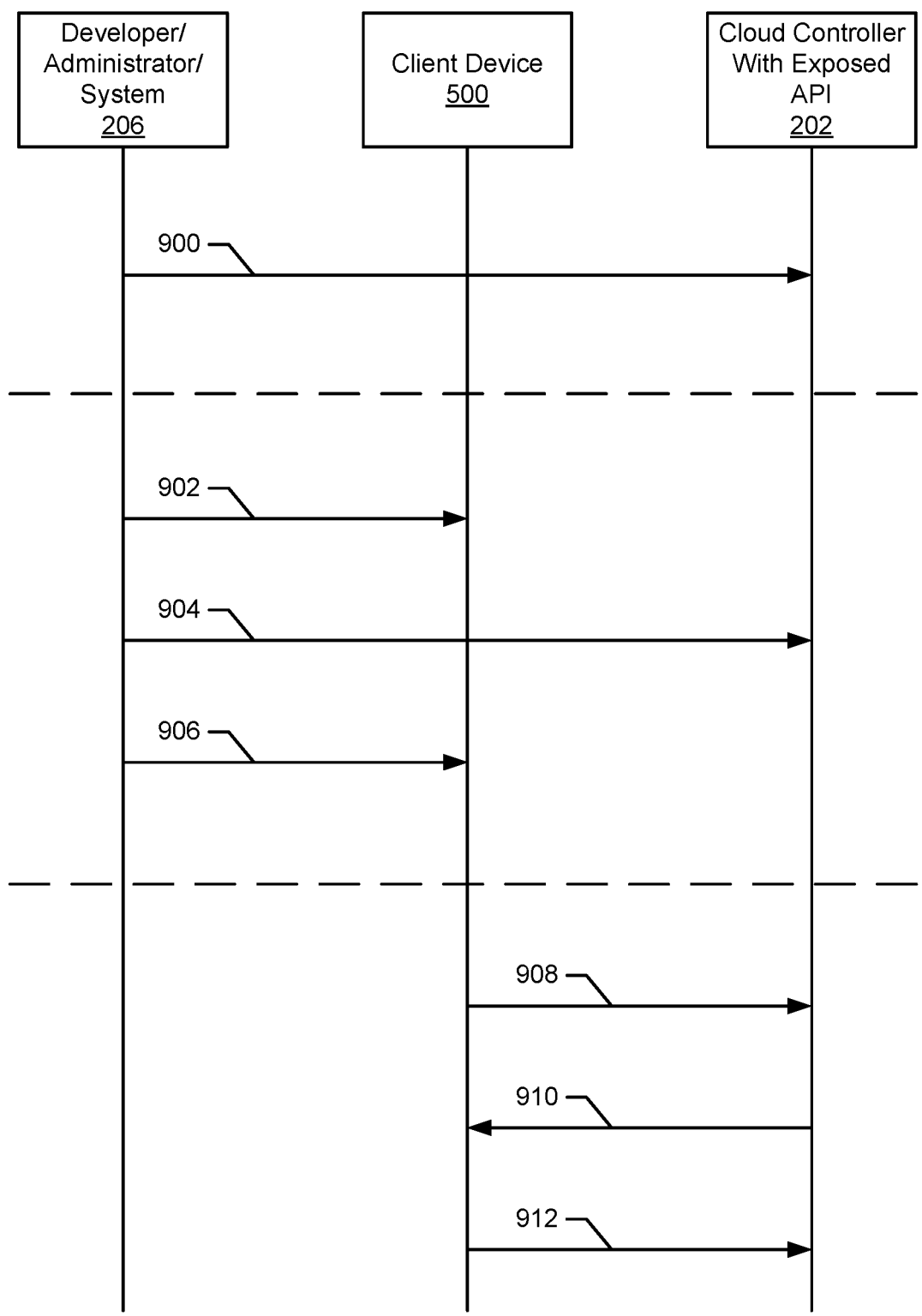
FIG. 9 illustrates an example communication flow diagram of adding a new configuration variable of a client device on a cloud network in accordance with various embodiments.

FIG. 9 illustrates an example communication flow for adding a new configuration variable of a client device 500 (e.g., router 110, computing device 130, client device 132, 134, IoT device 208) on a cloud network (e.g., remote server 150) in accordance with various embodiments. With reference to FIGS. 1-9, adding a new configuration variable of the client device 500 on the cloud network may include communications that may occur between a developer and/or administrator 206, the client device 500, and the cloud controller 202 on the cloud network. Adding a new configuration variable of the client device 500 on the cloud network may include, for example, enabling configuration of a latent capability of the client device 500. The following descriptions are presented in terms of a non-limiting example of enabling a communication capability, such as Bluetooth communication, on the client device 500 that was previously unavailable for use.

Adding a new configuration variable of the client device 500 on the cloud network may include the developer and/or administrator 206 sending 900 an update to the cloud controller 202 for use in updating a client device shadow associated with the client device 500. For example, the update may include updating the client device shadow to include a Bluetooth communication configuration. For another example, the update may include updating the client device shadow Bluetooth communication configuration to be enabled. Sending 900 the update to the cloud controller 202 for use in updating a client device shadow may be optional. For example, the client device shadow may already include and enable a configuration that is unavailable on the client device 500, and may not need to be updated.

The developer and/or administrator 206 may send 902 a new and/or updated schema to the client device 500. The new and/or updated schema may specify a configuration previously not specified or enabled for configuration on the client device. For example, the new and/or updated schema may specify Bluetooth communication configuration.

The developer and/or administrator 206 may send 904 a new and/or updated schema mapping definition to the cloud controller 202. The new and/or updated schema mapping definition may provide for mapping of the Bluetooth communication configuration from the client-device specific language to the client device-agnostic language.

The developer and/or administrator 206 may flash 906 a firmware of the client device 500 with the new and/or updated schema. In some examples, a customer (e.g., customer 204) and/or the client device 500 itself may implemented flashing the firmware. The firmware of the client device 500 may now be capable of enabling a Bluetooth communication configuration previously not configurable on the client device 500. For example, Bluetooth communication configurations may have been absent or not selectable in an interface (e.g., a website or application) for configuring the client device 500.

The client device 500 may connect 908 to the cloud network via the cloud controller 202. As part of or in response to the connection of the client device 500 to the cloud network, the cloud controller 202 may request 910 a schema from the client device 500. The client device 500 may respond to the request 912 by sending 808 the schema to the cloud controller 202. The schema sent to the cloud controller 202 may be the new and/or updated schema previously flashed 906 to the client device 500. The schema sent to the cloud controller 202 may be different from a previous schema uploaded to the cloud controller 202 upon which a client device shadow of the client device 500 may be based. For example, the client device shadow may have not or may not have available for configuration for Bluetooth communication, and now may have available for configuration for Bluetooth communication.

Figure 10:
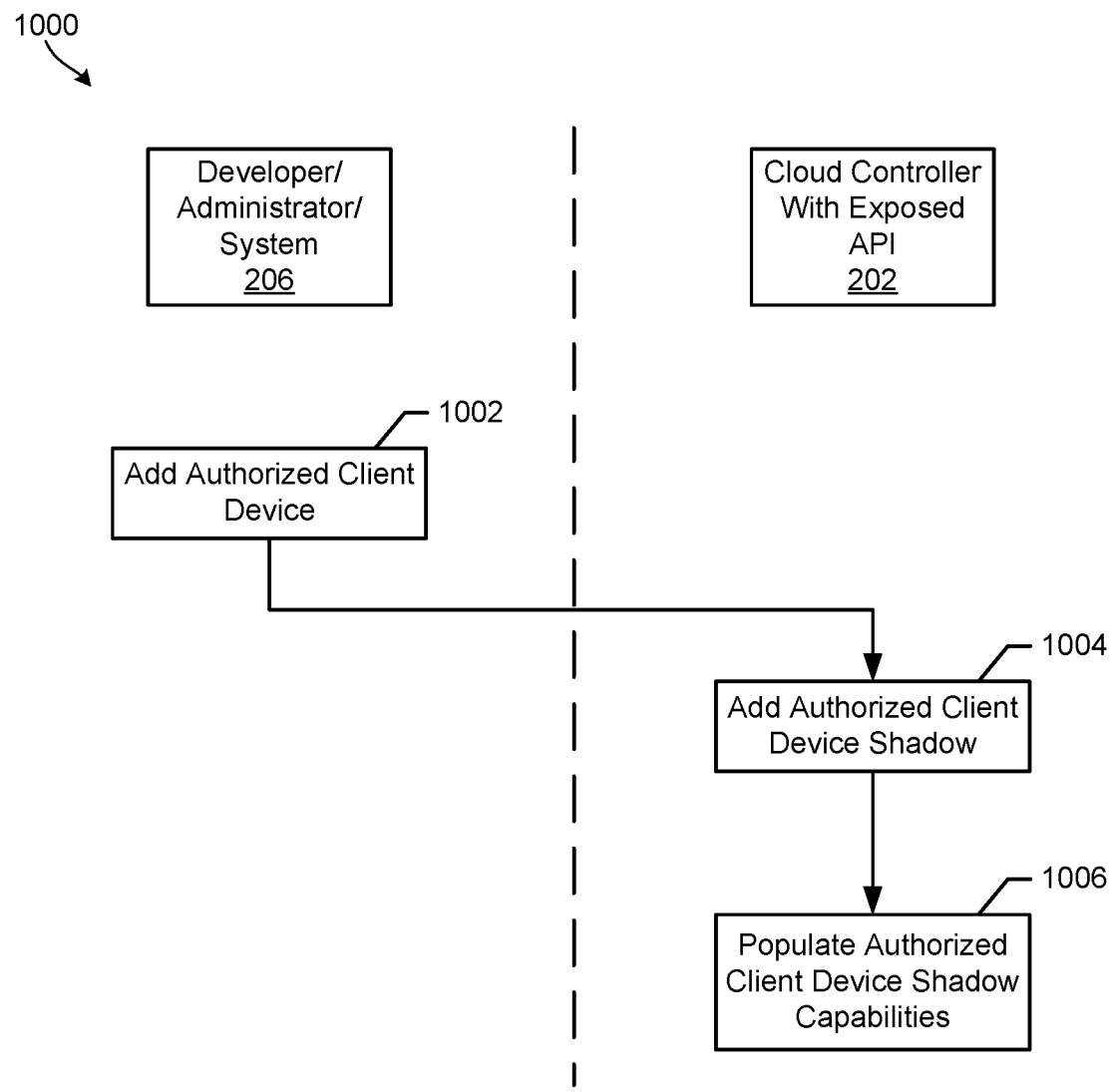
FIG. 10 is a process flow diagrams illustrating embodiment methods for adding a client device to a cloud network suitable for use with various embodiments.
Figure 11:
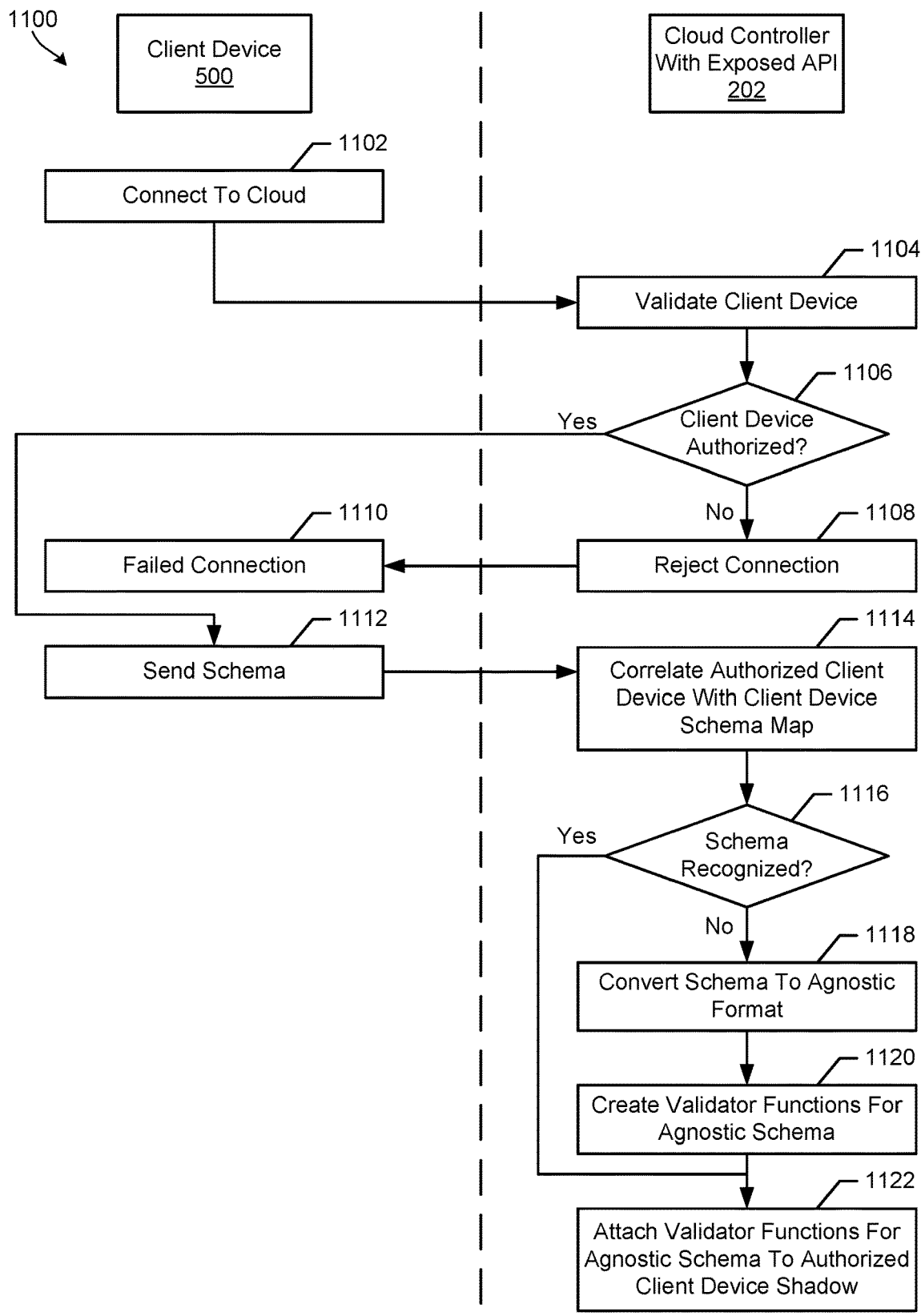
FIG. 11 is a process flow diagrams illustrating embodiment methods for connecting a client device to a cloud network suitable for use with various embodiments.

FIGS. 10, 11, and 12 illustrate example methods 1000, 1100, 1200, descriptions of which presented below are intended to be illustrative. In some embodiments, the methods 1000, 1100, 1200 may be accomplished with one or more additional operations not described, and/or without one or more of the operations discussed. Additionally, the order in which the operations of methods 1000, 1100, 1200 are illustrated in FIGS. 10, 11, and 12 and described below is not intended to be limiting.

In some examples, methods 1000, 1100, 1200 may be implemented in one or more processors (e.g., cloud controller 202) in conjunction with memory (e.g., memory 152). The one or more processor(s) may include one or more device(s) executing some or all of the operations of the methods 1000, 1100, 1200 in response to instructions stored electronically on an electronic storage medium. The one or more processor(s) may include one or more devices configured through hardware, firmware, and/or software to be specifically designed for execution of one or more of the operations of the methods 1000, 1100, 1200. For example, with reference to FIGS. 1-9, the operations of the methods 1000, 1100, 1200 may be performed by a processor of the cloud network (e.g., remote server 150).

FIG. 10 illustrates an example method 1000 for adding a client device (e.g., router 110, computing device 130, client device 132, 134, IoT device 208, client device 500) to a cloud network (e.g., remote server 150) suitable for use with various embodiments. With reference to FIGS. 1-10, a developer and/or administrator 206 may interact with and cause a cloud controller 202 to implement operations of the method 1000.

In block 1002, the developer and/or administrator 206 may access the cloud controller 202 to add an authorized client device to the cloud network. The developer and/or administrator 206 may access and use functionalities of the exposed API of the cloud controller 202 to cause the cloud controller 202 to implement a process for adding the authorized client device to the cloud network. In some examples, the developer and/or administrator 206 may upload and/or create through the exposed API a client device capability definition and schema mapping definition for a type of client device. Adding the authorized client device may involve accessing previously created schema mapping definitions for the authorized client device. The schema mapping definitions may be accessed based on an association with the authorized client device, such as based on a client device ID of the authorized client device associated with the schema mapping definitions.

In block 1004, the cloud controller 202 may add an authorized client device shadow. The authorized client device shadow may be a client device shadow created by execution of the client device shadow module 308, which may include instructions for execution by the cloud controller 202 to create a client device shadow as a representation of a client device stored in and synchronized with the cloud network.

In block 1006, the cloud controller 202 may populate capabilities of the authorized client device shadow. The cloud controller 202 may use the client device capability definition associated with the client device to determine the capabilities for the authorized client device shadow. The cloud controller 202 may populate the authorized client device shadow with the capabilities determined from the client device capability definition. The capabilities of the authorized client device shadow may be populated by execution of the client device shadow module 308, which may include instructions for execution by the cloud controller 202 to populate capabilities of the authorized client device shadow.

FIG. 11 illustrates an example method 1100 for connecting a client device 500 (e.g., router 110, computing device 130, client device 132, 134, IoT device 208) to a cloud network (e.g., remote server 150) suitable for use with various embodiments. With reference to FIGS. 1-11, the client device 500 may interact with and cause a cloud controller 202 to implement operations of the method 1100.

In block 1102, the client device 500 may initiate a connection with the cloud network via communication with the cloud controller 202. The client device 500 may initiate the connection and the client device 500 and the cloud controller 202 may establish a communication session. The cloud controller 202 may implement client device connection module 316 including instructions for execution by the cloud controller 202 to establish the communication session described further herein.

In block 1104, the cloud controller 202 may validate the client device 500 attempting to connect to the cloud network. The cloud controller 202 may validate the client device 500 via known means as part of establishing a communication session per any communication protocol. Such communication protocols may include a variety communication protocols of wireless (e.g., 5g-NR(u), LTE, Citizens Broadband Radio Service (CBRS), etc.) and/or wired network (e.g., Ethernet, TV cable, telephony, fiber optic and other forms of physical network connections) that may use one or more communication protocols, such as Ethernet, Point-To-Point protocol, High-Level Data Link Control (HDLC), Advanced Data Communication Control Protocol (ADCCP), and Transmission Control Protocol/Internet Protocol (TCP/IP). The cloud controller 202 may implement the client device connection module 316 including instructions for execution by the cloud controller 202 to validate the client device 500 attempting to connect to the cloud network.

In determination block 1106, the cloud controller 202 may determine whether client device 500 is authorized. The cloud controller 202 may determine authorization of the client device 500 based on the result of the validation of the client device 500 in block 1104. For example, in response to successful validation of the client device 500, the cloud controller 202 may determine that the client device is authorized. In response to unsuccessful validation of the client device 500, the cloud controller 202 may determine that the client device 500 is not authorized. The cloud controller 202 may implement the client device connection module 316 including instructions for execution by the cloud controller 202 to determine whether client device 500 is authorized.

In response to determining that the client device 500 is not authorized (i.e., determination block 1106="No"), the cloud controller 202 may reject the attempt to connect to the cloud network by the client device 500 in block 1108. In some examples, rejecting the attempt to connect to the cloud network by the client device 500 may include the cloud controller 202 allowing the connection attempt to lapse. In some examples, rejecting the attempt to connect to the cloud network by the client device 500 may include the cloud controller 202 sending a rejection signal to the client device 500. The cloud controller 202 may implement the client device connection module 316 including instructions for execution by the cloud controller 202 to reject the attempt to connect to the cloud network by the client device 500.

In block 1100, the client device 500 may determine that the connection attempt to the cloud network failed. In some examples, the client device 500 may determine that the connection to the cloud network failed upon a time period during which a signal for setting up the communication session is expected to be received lapsing without receiving the signal. In some examples, the client device 500 may determine that the connection to the cloud network failed upon receiving a rejection signal from the cloud controller 202.

In response to determining that the client device 500 is authorized (i.e., determination block 1106="Yes"), the client device 500 may send a client device schema to the cloud controller 202 in block 1102. In some examples, the client device 500 may send the client device schema in response to a signal received from the cloud controller 202 indicating to the client device 500 that the client device 500 is authorized and/or requesting for the client device 500 to send the client device schema. In some examples, the client device 500 may send client device metadata during connection to the cloud network and/or when sending the client device schema. The client device metadata may include information, such as a client device ID configured to identify the client device 500 to the cloud controller 202.

In block 1104, the cloud controller 202 may correlate the authorized client device 500 with schema map definitions for the client device 500. The cloud controller 202 may use metadata of the client device 500 to compare with information associated with the client device 500 that may be used to identify the client device, like a client device ID. A successful comparison of the metadata of the client device 500 and the information associated with the client device 500 may cause the cloud controller 202 to correlate the authorized client device 500 with schema map definitions for the client device 500. The cloud controller 202 may implement the schema translation module 306 including instructions for execution by the cloud controller 202 to correlate the authorized client device 500 with schema map definitions for the client device 500.

In determination block 1106, the cloud controller 202 may determine whether the client device schema is recognized. In some examples, the cloud controller 202 may compare metadata of the client device 500 and/or the schema received from the client device 500 to metadata for a client device-agnostic language schema to determine whether the client device schema is recognized. For example, the cloud controller 202 may compare a client device ID to a client device shadow ID, which may be the same as or contain the client device ID for a client device shadow corresponding to the client device 500. In response to a successful comparison, such as finding matching metadata for each the client device 500 and the client device shadow, the cloud controller 202 may determine that the client device schema is recognized. The cloud controller 202 may implement the schema translation module 306 including instructions for execution by the cloud controller 202 to determine whether the client device schema is recognized.

In response to determining that the client device schema is not recognized (i.e., determination block 1106="No"), the cloud controller 202 may convert the client device schema from a client device-specific language to a client device-agnostic language in block 1108. For example, the cloud controller 202 may parse the client device schema in the client device-specific language, and rewriting the client device schema in the client device-agnostic language using the parsed data. The cloud controller 202 may use a schema mapping definition for the client device 500 to rewrite the schema in the client device-agnostic language using the parsed data. The cloud controller 202 may implement the schema translation module 306 including instructions for execution by the cloud controller 202 to convert the client device schema from a client device-specific language to a client device-agnostic language.

In block 1120, the cloud controller 202 may create validator functions for the client device-agnostic language schema. The validator functions may be used to ensure any updates to a client device shadow are valid for the associated client device. The validator functions may be configured to validate format and/or content of a client device configuration data based on the client device schema in the client device-agnostic language, or the client device schema for the client device shadow. The validator functions may be associated with the client device-agnostic schema. The cloud controller 202 may implement the validator creation module 312 including instructions for execution by the cloud controller 202 to create validator functions for the client device-agnostic language schema.

In response to determining that the client device schema is recognized (i.e., determination block 1106="Yes"), or following the cloud controller 202 creating validator functions for the client device-agnostic language schema in block 1120, the control device may attach validator functions for the client device-agnostic language schema to the authorized client device shadow in block 1122. The validator functions may be attached to the authorized client device shadow by associating the validator functions with metadata of the authorized client device shadow, such as an authorized client device shadow ID. The cloud controller 202 may implement the validator creation module 312 including instructions for execution by the cloud controller 202 to attach the validator functions for the client device-agnostic language schema to the authorized client device shadow.

Figure 12A:
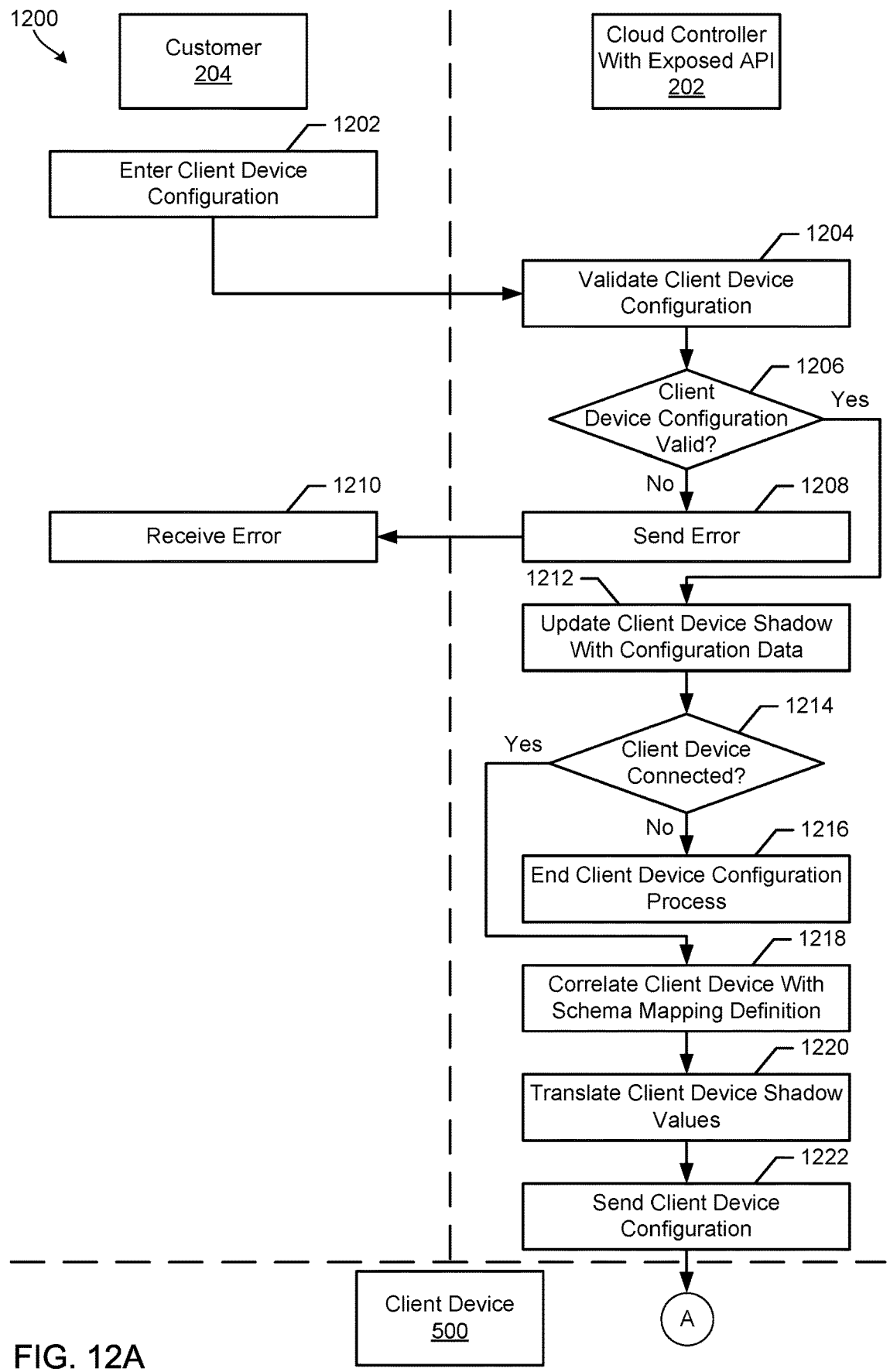
FIGS. 12A and 12B are process flow diagrams illustrating embodiment methods for changing a configuration of a client device on a cloud network suitable for use with various embodiments.
Figure 12B:
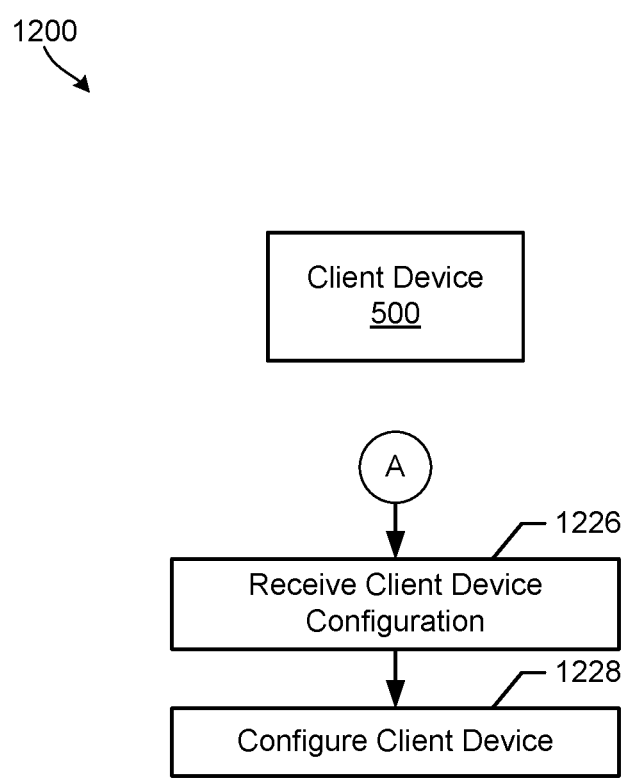

FIGS. 12A and 12B illustrates an example method 1200 for changing a configuration of a client device 500 (e.g., router 110, computing device 130, client device 132, 134, IoT device 208) on a cloud network (e.g., remote server 150) suitable for use with various embodiments. With reference to FIGS. 1-12B, a customer 204, may interact with and cause a cloud controller 202 and the client device 500 to implement operations of the method 1200.

In block 1202, the customer 204 may enter a client device configuration. For example, the client 204 may use a computing device (e.g., router 110, computing device 130, client device 132, 134, IoT device 208, client device 500) to access and interact with an interface (e.g., a website or application) for configuring the client device 500. The customer may enter character based data and/or make selections of options presented through the interface for configuring the client device 500.

In block 1204, the cloud controller 202 may validate the client device configuration entered by the customer 204. The cloud controller 202 may receive client device configuration data generated by the interface based on the customer's entered client device configuration. The cloud controller 202 may implement the client device connection module 316 including instructions for execution by the cloud controller 202 to receive the client device configuration data generated by the interface based on the customer's entered client device configuration. The cloud controller 202 may validate the client device configuration data using validator functions associated with the client device shadow for the client device. The cloud controller 202 may identify the appropriate validator functions based on metadata received with the client device configuration data that may identify the client device and that may be associated with the client device shadow, such as a client device ID. The validator functions may be input with the client device configuration data and validate whether the client device configuration data format and/or content is acceptable for the schema of the client device shadow. The cloud controller 202 may implement the client device connection module 316 including instructions for execution by the cloud controller 202 to send the error signal to the customer 204. The cloud controller 202 may implement the client device validation module 314 including instructions for execution by the cloud controller 202 to validate the client device configuration entered by the customer 204.

In determination block 1206, the cloud controller 202 may determine whether the client device configuration data entered by the customer 204 is valid. Whether the client device configuration data entered by the customer is valid may be based on the results of the client device configuration data validation in block 1204. A successful validation result of the client device configuration data may indicate to the cloud controller 202 that the client device configuration data is valid. An unsuccessful validation result of the client device configuration data may indicate to the cloud controller 202 that the client device configuration data is not valid. The cloud controller 202 may implement the client device validation module 314 including instructions for execution by the cloud controller 202 to determine whether the client device configuration data entered by the customer 204 is valid.

In response to determining that the client device configuration data is not valid (i.e., determination block 1206="No"), the cloud controller 202 may send an error signal to the customer 204 in block 1208. The cloud controller 202 may send the error signal to the customer 204 via the interface used by the customer 204 to configure the client device 500. The cloud controller 202 may implement the client device connection module 316 including instructions for execution by the cloud controller 202 to send the error signal to the customer 204. In block 1210, the computing device 500 may receive the error signal from the cloud controller 202. The interface may present the error signal to the customer 204, for example, in the form of a visual, audible, and/or tactile error message or prompt.

In response to determining that the client device configuration data is valid (i.e., determination block 1206="Yes"), the cloud controller 202 may update a client device shadow with the validated client device configuration data in block 1212. The cloud controller 202 may update the client device shadow for the client device. The cloud controller 202 may identify the appropriate client device shadow based on metadata received with the client device configuration data that may identify the client device and that may be associated with the client device shadow, such as a client device ID. The cloud controller may write the configuration data to the client device shadow. The cloud controller 202 may implement the client device shadow module 308 including instructions for execution by the cloud controller 202 to update the client device shadow with the validated client device configuration data.

In determination block 1214, the cloud controller 202 may determine whether the client device 500 is connected to the cloud network. The cloud controller 202 may determine from communication sessions with the cloud controller 202 whether the client device 500 is connected to the cloud network. For example, the cloud network may store metadata of computing devices (e.g., router 110, computing device 130, client device 132, 134, IoT device 208, client device 500), including client device IDs, with communication sessions with the cloud controller 202. The cloud controller 202 may compare metadata for the client device configuration data and/or the client device shadow with the metadata of the computing devices with communication sessions with the cloud controller 202 to determine whether any of the computing devices include metadata correlating to the metadata of the client device configuration data and/or the client device shadow. The cloud controller 202 may implement the client device connection module 316 including instructions for determining whether the client device 500 is connected to the cloud network.

In response to determining that the client device 500 is not connected to the cloud network (i.e., determination block 1214="No"), the cloud controller 202 may end the client device configuration process in block 1216. In response to determining that the client device 500 is connected to the cloud network (i.e., determination block 1214="Yes"), the cloud controller 202 may correlate the client device 500 with a schema mapping definition. In some examples, the cloud controller 202 may determine from the metadata of the schema mapping definition, such as a client device ID, which schema mapping definition to correlate with the connected client device 500. The cloud controller 202 may compare metadata of the schema mapping definition with the metadata of the client device 500, the client device configuration data, and/or the client device shadow to determine which schema mapping definition contains metadata similar to the metadata of the client device 500, the client device configuration data, and/or the client device shadow. In some examples, the schema mapping definition may be associated with a client device shadow, such as in a table or other data structure, and may leverage the association between the client device shadow and the client device 500 to determine which schema mapping definition to correlate with the client device 500. The cloud controller 202 may implement the schema mapping definition module 304 and/or the schema translation module 306 including instructions for correlating the client device 500 with a schema mapping definition.

In block 1220, the cloud controller 202 may translate the client device shadow configurate data from the client device-agnostic language to the client device-specific language for the client device 500. The cloud controller 202 may use the correlated schema mapping definition to translate the client device shadow configurate data to the format that is understandable by the client device. The cloud controller 202 may parse the client device shadow configurate data and apply the schema mapping definition to generate a schema with the configuration data for the client device 500. The cloud controller 202 may implement the schema translation module 306 including instructions for translating the client device shadow configurate data from the client device-agnostic language to the client device-specific language for the client device 500.

In block 1224, the cloud controller 202 may send the client device configuration data to the client device 500. The cloud controller 202 may send the client device configuration data in the form of the schema in the client device-specific language with the configuration data for the client device 500. The cloud controller 202 may implement the client device connection module 316 including instructions for sending the client device configuration data to the client device 500. In block 1226, the client device 500 may receive the client device configuration data from the cloud controller 202. In block 1228, the client device 500 may use the configuration data to configure the capabilities of the client device 500.

Figure 13:
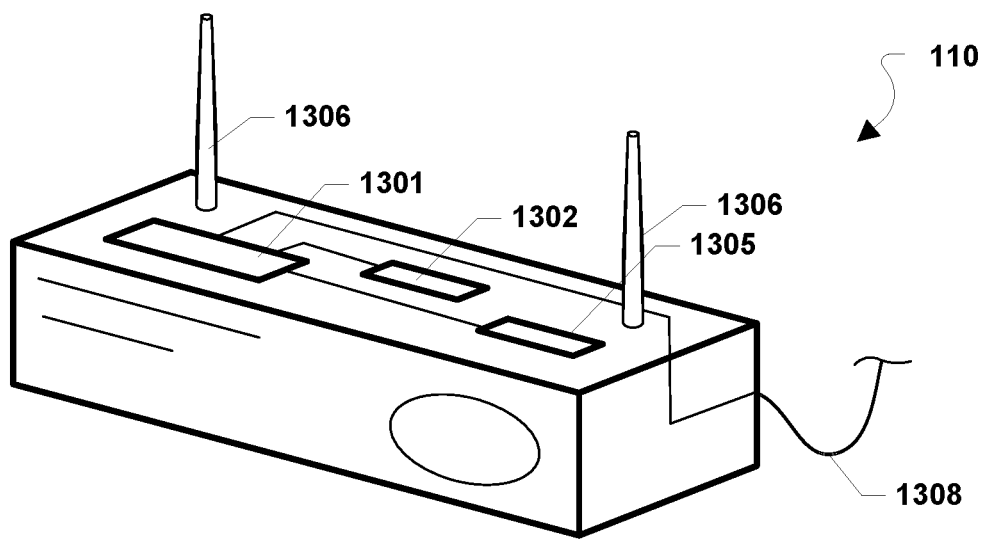
FIG. 13 is a component diagram of an example router suitable for use with various embodiments

The various embodiments (including, but not limited to, embodiments discussed above with reference to FIGS. 1-12B) may also be implemented on any of a variety of routers, as illustrated in FIG. 13. With reference to FIGS. 1-13, a router 110 may include a processor 1301 coupled to volatile memory 1302. The router 110 may also include one or more connections or port(s) 1306 coupled to the processor 1301 and configured to input and/or output data from the port(s) 1308. The router 110 may also include one or more network transceivers 1305, with one or more antenna 1306 coupled thereto, providing a network access port, coupled to the processor 1301 for establishing wired or wireless network interface connections with a communication network, such as a local area network coupled to other computing devices and routers/switches, the Internet, the public switched telephone network, and/or a cellular network (e.g., CDMA, TDMA, GSM, PCS, 3G, 4G, LTE, or any other type of cellular network). The router 110 may transmit and/or receive data or other communications via the network transceiver 1305 and/or the port(s) 1308.

Figure 14:
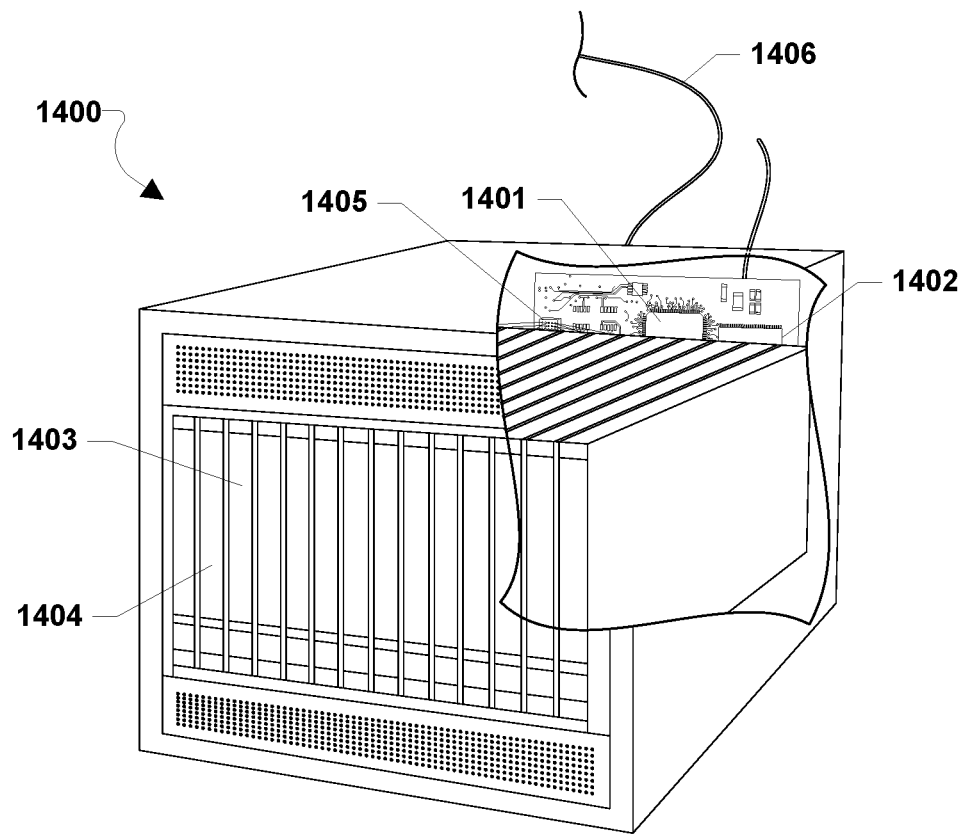
FIG. 14 is a component diagram of an example server suitable for use with the various embodiments.

Various embodiments (including, but not limited to, embodiments discussed above with reference to FIGS. 1-12B) may be implemented on any of a variety of commercially available servers (e.g., remote server 150), which may be used/accessed by a user computing device (e.g., computing device 130), a router (e.g., router 110) and/or a client device (e.g., router 110, computing device 130, client device 132, 134, IoT device 208, client device 500) such as the server 1400 illustrated in FIG. 14. The server 1400 may include a processor 1401 coupled to volatile memory 1402 and a large capacity nonvolatile memory, such as a disk drive 1403. The server 1400 may also include a floppy disc drive, compact disc (CD) or DVD disc drive 1404 coupled to the processor 1401. The server 1400 may also include network access ports 1406 coupled to the processor 1401 for establishing data connections with a network connection circuit 1405 and a communication network (e.g., IP network) coupled to other communication system network elements.

Figure 15:
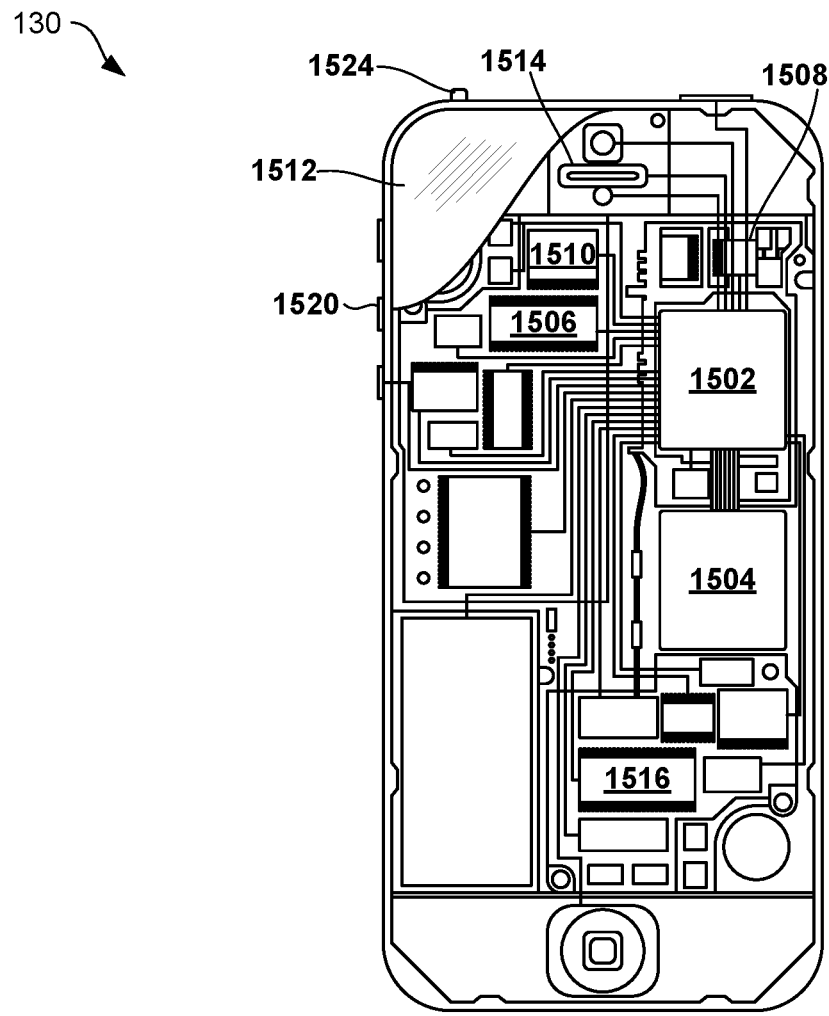
FIG. 15 is a component diagram of an example user computing device suitable for use with various embodiments.

Various embodiments (including, but not limited to, embodiments discussed above with reference to FIGS. 1-12B) may be implemented on or in conjunction with a variety of computing devices, an example of which is illustrated in FIG. 15 in the form of a user computing device 130. With reference to FIGS. 1-12B, the user computing device 130 may include a first system-on-chip (SoC) 1502 (e.g., a SoC-CPU) coupled to a second SoC 1504 (e.g., a 5G capable SoC), such as D2D links establish in the dedicated ITS 5.9 GHz spectrum communications. The first and/or second SOCs 1502, 1504 may be coupled to internal memory 1513, 1525, a display 1515, and to a speaker 1514. Additionally, the user computing device 130 may include one or more antenna 1524 for sending and receiving electromagnetic radiation that may be connected to one or more wireless transceivers 1508 (e.g., a wireless data link and/or cellular transceiver, etc.) coupled to one or more processors in the first and/or second SOCs 1502, 1504. Mobile computing devices 1500 may also include menu selection buttons or rocker switches 1520 for receiving user inputs.

User computing devices 130 may additionally include a sound encoding/decoding (CODEC) circuit 1510, which digitizes sound received from a microphone into data packets suitable for wireless transmission and decodes received sound data packets to generate analog signals that are provided to the speaker to generate sound. Also, one or more of the processors in the first and/or second SOCs 1502, 1504, wireless transceiver 1508 and CODEC circuit 1510 may include a digital signal processor (DSP) circuit (not shown separately).

The processors 1301, 1401, 1502, and 1504 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 1301, 1401, 1502, and 1504. The processors 1301, 1401, 1502, and 1504 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 1301, 1401, 1502, and 1504 including internal memory or removable memory plugged into the device and memory within the processors 1301, 1401, 1502, and 1504 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a module may be, but is not limited to, a process running on a processor, a processor, an object, an executable, a thread of execution, a program, or a computer. By way of illustration, both an application running on a computing device and the computing device may be referred to as a module. One or more modules may reside within a process or thread of execution and a module may be localized on one processor or core or distributed between two or more processors or cores. In addition, these modules may execute from various non-transitory processor-readable storage media having various instructions or data structures stored thereon. Modules may communicate by way of local or remote processes, function or procedure calls, electronic signals, data packets, memory read/writes, and other known network, computer, processor, or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable storage media. Additionally, the operations of a method or algorithm may reside as one or any combination or set of codes and/or instructions on a non-transitory server-readable, processor-readable medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein

What is claimed is:

1. A method for client-driven dynamic server-side configuration validation, comprising:
   validating client device configuration data for a client device;
   updating a client device shadow with the validated client device configuration data, wherein the client device shadow includes a schema in a client device-agnostic language; and
   translating client device configuration data of the client device shadow from the client device-agnostic language to a client device-specific language for the client device.

2. The method of claim 1, further comprising:
   receiving the client device configuration data from a computing device implementing a client device configuration interface over a communication network, wherein the client device configuration data is based on a customer interacting with the client device configuration interface; and
   sending the client device configuration data of the client device shadow in the client device-specific language to the client device via a communication network.

3. The method of claim 1, further comprising:
   translating a client device schema from the client device-specific language to the client device-agnostic language;
   identifying differences in the client device schema from the schema of the client device shadow; and
   updating the client device shadow with the differences in the client device schema from the schema of the client device shadow.

4. The method of claim 3, wherein:
   translating the client device schema from the client device-specific language to the client device-agnostic language comprises using a schema mapping definition to translate the client device schema from the client device-specific language to the client device-agnostic language; and
   translating the client device configuration data of the client device shadow from the client device-agnostic language to the client device-specific language comprises using the schema mapping definition to translate the client device configuration data of the client device shadow from the client device-agnostic language to the client device-specific language.

5. The method of claim 1, further comprising creating a set of validator functions for the schema in the client device-agnostic language, wherein validating the client device configuration data comprises using the set of validator functions to validate the client device configuration data.

6. The method of claim 5, further comprising associating the set of validator functions with the schema of the client device shadow in the client device-agnostic language.

7. The method of claim 1, further comprising:
   correlating the client device with a schema mapping definition configured for translating schemas between the client device-specific language and the client device-agnostic language, wherein the schemas include a client device schema and the schema of the client device shadow; and
   correlating the client device shadow with the schema mapping definition.

8. A cloud network computing device, comprising a processor configured with executable instructions configured to cause the processor to perform operations comprising:
   validating client device configuration data for a client device;
   updating a client device shadow with the validated client device configuration data, wherein the client device shadow includes a schema in a client device-agnostic language; and
   translating client device configuration data of the client device shadow from the client device-agnostic language to a client device-specific language for the client device.

9. The cloud network computing device of claim 8, wherein the processor is configured with executable instructions configured to cause the processor to perform operations further comprising:
   receiving the client device configuration data from a computing device implementing a client device configuration interface over a communication network, wherein the client device configuration data is based on a customer interacting with the client device configuration interface; and
   sending the client device configuration data of the client device shadow in the client device-specific language to the client device via a communication network.

10. The cloud network computing device of claim 8, wherein the processor is configured with executable instructions configured to cause the processor to perform operations further comprising:
    translating a client device schema from the client device-specific language to the client device-agnostic language;
    identifying differences in the client device schema from the schema of the client device shadow; and
    updating the client device shadow with the differences in the client device schema from the schema of the client device shadow.

11. The cloud network computing device of claim 10, wherein the processor is configured with executable instructions configured to cause the processor to perform operations such that:
    translating the client device schema from the client device-specific language to the client device-agnostic language comprises using a schema mapping definition to translate the client device schema from the client device-specific language to the client device-agnostic language; and
    translating the client device configuration data of the client device shadow from the client device-agnostic language to the client device-specific language comprises using the schema mapping definition to translate the client device configuration data of the client device shadow from the client device-agnostic language to the client device-specific language.

12. The cloud network computing device of claim 8, wherein the processor is configured with executable instructions configured to cause the processor to perform operations further comprising creating a set of validator functions for the schema in the client device-agnostic language, wherein validating the client device configuration data comprises using the set of validator functions to validate the client device configuration data.

13. The cloud network computing device of claim 12, wherein the processor is configured with executable instructions configured to cause the processor to perform operations further comprising associating the set of validator functions with the schema of the client device shadow in the client device-agnostic language.

14. The cloud network computing device of claim 8, wherein the processor is configured with executable instructions configured to cause the processor to perform operations further comprising:

correlating the client device with a schema mapping definition configured for translating schemas between the client device-specific language and the client device-agnostic language, wherein the schemas include a client device schema and the schema of the client device shadow; and correlating the client device shadow with the schema mapping definition.

15. A non-transitory processor-readable medium having stored thereon processor-executable instructions configured to cause a processing device to perform operations comprising:

validating client device configuration data for a client device;

updating a client device shadow with the validated client device configuration data, wherein the client device shadow includes a schema in a client device-agnostic language; and translating client device configuration data of the client device shadow from the client device-agnostic language to a client device-specific language for the client device.

16. The non-transitory processor-readable medium of claim 15, wherein the stored processor-executable instructions are configured to cause the processing device to perform operations further comprising:

receiving the client device configuration data from a computing device implementing a client device configuration interface over a communication network, wherein the client device configuration data is based on a customer interacting with the client device configuration interface; and sending the client device configuration data of the client device shadow in the client device-specific language to the client device via a communication network.

17. The non-transitory processor-readable medium of claim 15, wherein the stored processor-executable instructions are configured to cause the processing device to perform operations further comprising:

translating a client device schema from the client device-specific language to the client device-agnostic language;

identifying differences in the client device schema from the schema of the client device shadow; and updating the client device shadow with the differences in the client device schema from the schema of the client device shadow.

18. The non-transitory processor-readable medium of claim 17, wherein the stored processor-executable instructions are configured to cause the processing device to perform operations such that:

translating the client device schema from the client device-specific language to the client device-agnostic language comprises using a schema mapping definition to translate the client device schema from the client device-specific language to the client device-agnostic language; and translating the client device configuration data of the client device shadow from the client device-agnostic language to the client device-specific language comprises using the schema mapping definition to translate the client device configuration data of the client device shadow from the client device-agnostic language to the client device-specific language.

19. The non-transitory processor-readable medium of claim 15, wherein the stored processor-executable instructions are configured to cause the processing device to perform operations further comprising creating a set of validator functions for the schema in the client device-agnostic language, wherein validating the client device configuration data comprises using the set of validator functions to validate the client device configuration data.

20. The non-transitory processor-readable medium of claim 19, wherein the stored processor-executable instructions are configured to cause the processing device to perform operations further comprising associating the set of validator functions with the schema of the client device shadow in the client device-agnostic language.

21. The non-transitory processor-readable medium of claim 15, wherein the stored processor-executable instructions are configured to cause the processing device to perform operations further comprising:

correlating the client device with a schema mapping definition configured for translating schemas between the client device-specific language and the client device-agnostic language, wherein the schemas include a client device schema and the schema of the client device shadow; and correlating the client device shadow with the schema mapping definition.

\* \* \* \* \*